United States Patent
Ooyama et al.

(10) Patent No.: US 6,460,500 B1
(45) Date of Patent: Oct. 8, 2002

(54) START CONTROL SYSTEM FOR INTERNAL COMBUSTION ENGINE

(75) Inventors: Kazuo Ooyama; Koichi Fushimi, both of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/659,596

(22) Filed: Sep. 11, 2000

(30) Foreign Application Priority Data

Sep. 13, 1999 (JP) .......................................... 11-259373

(51) Int. Cl.$^7$ ................................................ F02N 7/06
(52) U.S. Cl. ............................... 123/179.3; 123/179.31; 123/179.4
(58) Field of Search ........................... 123/179.3, 179.4, 123/179.31

(56) References Cited

U.S. PATENT DOCUMENTS

| | | | | |
|---|---|---|---|---|
| 2,960,082 A | * | 11/1960 | Smith .................... | 123/179.31 |
| 4,901,689 A | * | 2/1990 | Cummins et al. ........ | 123/179.3 |
| 5,337,713 A | * | 8/1994 | Mills ....................... | 123/179.3 |
| 5,601,058 A | * | 2/1997 | Dyches et al. ........... | 123/179.2 |
| 6,202,615 B1 | * | 3/2001 | Pels et al. ............... | 123/179.21 |

* cited by examiner

*Primary Examiner*—Gene Mancene
*Assistant Examiner*—Arnold Castro
(74) *Attorney, Agent, or Firm*—Armstrong, Westerman & Hattori, LLP

(57) ABSTRACT

A start control system for an internal combustion engine which is capable of automatically restarting the engine while ensuring excellent startability and fuel economy of the engine, and permits reduction of the size of the system, to reduce the weight and manufacturing costs of the system. An electric motor drives an oil pump. An accumulator accumulates oil pressure delivered from the oil lamp. A hydraulic motor is connected to the accumulator via oil passage and driven by the oil pressure accumulated in the accumulator, for starting the engine. An electromagnetic valve is arranged across the oil passage, for controlling supply of oil pressure to the hydraulic motor. An ECU controls operation of the oil pressure supply control valve to thereby cause the hydraulic motor to start the engine.

10 Claims, 11 Drawing Sheets

START CONTROL SYSTEM FOR INTERNAL COMBUSTION ENGINE

BACKGROUND OF THE INVENTION

1. Field of the Invention

This invention relates to a start control system for an internal combustion engine of a type which starts the engine by utilizing oil pressure.

2. Description of the Related Art

Conventionally, in a start system for an internal combustion engine for an automotive vehicle, when the driver operates an ignition key to start the engine, electric power is supplied from a battery to an electric motor of a starter, whereby the electric motor forcibly causes rotation of a crankshaft of the engine, and at the same time an air-fuel mixture is supplied to cylinders of the engine. The air-fuel mixture thus supplied to cylinders is ignited to start the engine. Then, after the start of the engine, the driver releases the ignition key, whereby the electric motor is stopped.

Further, in recent years, a start control system for an internal combustion engine for an automotive vehicle has been employed which is capable of automatically stopping idling of the engine, e.g., when the driver is waiting for traffic lights to change or for a crossing gate to open, and then automatically restarting the engine when the vehicle is started. In the start control system, the restart of the engine after the automatic stoppage of idling is carried out by causing the above start system to operate in response to a vehicle start operation by the driver. The driver's vehicle start operation includes operating a clutch or a shift gear, releasing a brake, or stepping on an accelerator pedal. When the vehicle start operation is carried out, electric power is supplied from the battery to the electric motor of the starter, whereby the electric motor forcibly causes rotation of the crankshaft, and the mixture is supplied to the cylinders. The air-fuel mixture thus supplied to the cylinders is ignited to start the engine. According to this start control system, because idling is automatically stopped, as described above, e.g., when the driver is waiting for traffic lights to change, excellent fuel economy can be ensured.

However, the above start control system uses the battery as a power source for the electric motor of the starter, and the starting torque of the motor is small. Hence, the motor is generally combined with a reduction gear system. For this reason, during the start or restart of the engine, the crankshaft can only be rotated at a rotational speed which is considerably loser than an idling rotational speed, so that it takes much time for the engine to start actually. Further, during cranking of the engine there occurs torque variation due to compression and expansion of air within the cylinder of the engine, which causes variation in the rotational speed of the crankshaft. In this case, the rotational speed of the crankshaft driven by the electric motor is reduced due to increased viscous friction of lubricating oil in the engine and stabilized at a low level, so that the variation in the rotational speed of the crankshaft becomes large, which causes the reduction gear mechanism to produce untoward noises. As described above, because it takes much time before the engine is actually started to start the vehicle in response to the vehicle start operation by the driver, and vibrations of the engine and noises from the driving system, which are undesired by the driver, are caused during the start of the engine, the start control system degrades marketability of the vehicle.

To solve the problems, there was proposed a start control system for an internal combustion engine e.g. in Japanese Laid-Open Patent Publication (Kokai) No. 60-85249, in which compressed air is utilized to start the engine. The start control system includes a compressor driven by rotation of a crankshaft and a reserve tank for storing compressed air supplied from the compressor. According to the system, in response to an engine start operation by an ignition key, the crankshaft is driven for rotation by using the compressed air in the reserve tank as a driving force source, whereby the engine is started. Also, for the restart of the engine, similar control is carried out in response to the engine start operation by the ignition key. Thus, the use of the compressed air makes it possible to obtain larger torque than the torque from the electric motor of the starter, thereby shortening the time period required for starting the engine. Further, it is possible to increase the engine rotational speed to the idling rotational speed in a short time period, thereby reducing vibration of the engine and noises caused during the start of the engine.

Further, there has been proposed another type of the start control system for an internal combustion engine, which includes a large-sized electric motor and a large-capacity battery, and is applied to a vehicle configured to travel by driving force from the large-sized electric motor and the internal combustion engine installed thereon, i.e., a so-called hybrid vehicle. Some of the start control systems of this type are capable of not only starting the engine by the large-sized electric motor, but also automatically restarting the engine without the engine start operation by the ignition key. Through the use of the large-sized electric motor which generates considerably larger torque in comparison with the electric motor of the starter, this type of the start control system is capable of starting the engine in a shorter time period as well as reducing the vibrations of the engine. Further, because the engine can be automatically restarted without the engine start operation by the ignition key, high marketability of the system is ensured.

However, according to the above conventional start control system using compressed air, because the torque of the engine is employed as a driving force source for the compressor, it is impossible to drive the compressor during stoppage of the engine. For this reason, when compressed air within the reserve tank was consumed by an erroneous operation or the like before the stoppage of the engine, and no pressure has been stored within the tank, the engine cannot be started. Further, there is a limit to available high pressure of air, and it is required to provide a large-sized reserve tank so as to secure sufficient amount of compressed air for starting the engine, which results in an increase in the weight of the system and makes it difficult to provide space for accommodating the system. Moreover, when the temperature falls, saturation vapor pressure also decreases, which causes condensation within the reserve tank and piping. When the temperature becomes extremely low, the condensed water freezes, which can cause breakage or failure of the system. Another problem is that a large amount of energy remains in the compressed air discharged from the start control system during operation of the same, and noise produced by the discharge can become considerably large untoward noise. Still another problem is that it is required to carry out the engine start operation by the ignition key to restart the engine.

On the other hand, the conventional start control systems of the type which is applied to the hybrid vehicle are each required to be provided with a large-sized electric motor and a large-capacity battery which are very expensive and heavy, which results in considerable increases in the weight and manufacturing costs of the system.

SUMMARY OF THE INVENTION

It is an object of the invention to provide a start control system for an internal combustion engine, which is capable of automatically restarting the engine while ensuring excellent startability and fuel economy of the engine, and permits reduction of the size of the system, to reduce the weight and manufacturing costs of the system.

To attain the above object, the present invention provides a start control system for an internal combustion engine, comprising:

an electric motor;

an oil pump driven by the electric motor;

an accumulator for accumulating oil pressure delivered from the oil pump;

an oil passage through which the oil pressure is transmitted;

a hydraulic actuator connected to the accumulator via the oil passage and driven by the oil pressure accumulated in the accumulator, for starting the engine;

an oil pressure supply control valve arranged across the oil passage, for controlling supply of the oil pressure to the hydraulic actuator; and control means for controlling operation of the oil pressure supply control valve to thereby cause the hydraulic actuator to start the engine.

According to this start control system for an internal combustion engine, the oil pump is driven by the electric motor, and oil pressure delivered from the oil pump is accumulated in the accumulator. When the engine is to be started, the control means controls the operation of the oil pressure supply control valve to cause the oil pressure to be supplied from the accumulator to the hydraulic actuator. As a result, the hydraulic actuator is driven to start the engine. In the start control system of the invention, the oil pressure generated by the electric motor is utilized to start the engine as described above, so that even during stoppage of the engine, it is possible to operate the electric motor to thereby accumulate oil pressure in the accumulator in preparation for the next start of the engine. Thus, differently from the conventional start control system using compressed air, the system of the invention can ensure excellent startability of the engine without suffering from a problem that the engine cannot be started properly when it is started next time after the stoppage.

Further, for the same reason, the system of the present invention is capable of generating higher pressure than the prior art using compressed air, so that the entire accumulator can be reduced in size, which permits the system to be designed to be more compact. Moreover, in general, a hydraulic actuator is capable of generating a larger driving force than an electric motor conventionally used for a starter of the engine, so that it is possible to increase the rotational speed of the engine during a cranking time to a desired rotational speed which is higher than that in the prior art, e.g. a rotational speed higher than an idling rotational speed. At the same time, the large driving force makes it possible to shorten a time period which the engine takes to reach the desired rotational speed, thereby reducing vibrations caused by the engine and noises produced by the driving system during the start of the engine. Further, since the start control system of the invention uses oil as a working medium, and the oil is smaller than the air in volume change caused by a pressure change, energy remaining in oil discharged from the system is smaller than energy conventionally remaining in the discharged compressed air, which makes it possible to reduce noises produced during the discharge of the working medium. For the same reason, the system of the invention is also capable of preventing freezing and breakage of the system due to the freezing, differently from the prior art using the air as a working medium. In addition, the system of the present invention is only required to be provided with an electric motor capable of generating torque for driving the oil pump for rotation and a battery capable of driving the electric motor, so that a large-sized electric motor and a large-capacity battery which are used in the conventional start control system applied to hybrid vehicles can be dispensed with. This makes it possible to reduce the size and weight of the system, which contributes to reduction of the manufacturing costs of the same. The above features and advantages ensure high marketability of the system.

Preferably, the start control system further comprises engine rotational speed-detecting means for detecting an engine rotational speed of the engine, and the control means controls the operation of the oil pressure supply control valve such that the supply of the oil pressure to the hydraulic actuator is stopped when the detected engine rotational speed has exceeded a predetermined rotational speed after the supply of the oil pressure to the hydraulic actuator was started.

According to this preferred embodiment, the supply of oil pressure to the hydraulic actuator is stopped by the control means when the detected engine rotational speed has exceeded a predetermined rotational speed. Therefore, it is possible to start the engine reliably by properly setting the predetermined rotational speed to a desired rotational speed. Further, in the start control system using the hydraulic actuator, even after the engine rotational speed has exceeded the predetermined rotational speed, and it is instructed that the supply of oil pressure to the hydraulic motor be stopped, the hydraulic actuator continues to drive the engine, e.g., due to a time lag in operation of the oil pressure supply control valve, whereby the engine rotational speed is further increased. Therefore, it is possible to set the predetermined rotational speed to a value slightly lower than the desired rotational speed, allowing for the increase in the engine rotational speed. This makes it possible to shorten a time period for supplying the oil pressure to the accumulator, thereby preventing unnecessary reduction of the oil pressure accumulated in the accumulator. As a result, the time over which the electric motor is operated can be shortened, and consumption of electric power can be reduced.

More preferably, the start control system further comprises engine temperature-detecting means for detecting an engine temperature of the engine, and the predetermined rotational speed is set to be higher as the detected engine temperature is lower.

In general, in an internal combustion engine, as the engine temperature is lower, the viscous resistance of lubricating oil becomes larger to increase viscous friction in the engine, and it becomes harder to effect ignition, so that when the engine temperature is low, the startability of the engine is lower than under normal starting conditions. Therefore, according to the above preferred embodiment, the predetermined rotational speed is set to be higher as the detected engine temperature is lower, whereby the engine can be properly started dependent on the engine temperature at the time of start of the engine.

Also more preferably, the start control system further comprises a stop time period-determining means for determining whether or not a stop time period over which the engine has been in stoppage before a start of the engine is longer than a predetermined time period, and when the stop time period-determining means determines that the stop time period is longer than the predetermined time period, the predetermined rotational speed is set to a first predetermined rotational speed, whereas when the stop time period-determining means determines that the stop time period is equal to or shorter than the predetermined time period, the predetermined rotational speed is set to a second predetermined rotational speed which is lower than the first predetermined rotational speed.

In general, when a stop time period of the engine is short, a decrease in the engine temperature is small, and hence, the viscous friction in the engine is also small. Further, a decrease in the oil temperature within the system is also small, and hence the responsivity of the hydraulic actuator is high. In view of this, according to the above preferred embodiment, when the stop time period is shorter than the predetermined time period, the engine rotational speed at the stoppage of the supply of oil pressure to the hydraulic actuator is set to the second predetermined rotational speed which is lower than the first predetermined rotational speed. As a result, excellent startability of the engine can be maintained according to the stop time period before the start of the engine, and at the same time, since the time period for supplying oil pressure to the hydraulic actuator can be shortened, it is possible to utilize oil pressure within the accumulator efficiently.

Preferably, the start control system further comprises misfire-detecting means for detecting a misfire of the engine, and the control means controls the operation of the oil pressure supply control valve such that the supply of the oil pressure to the hydraulic actuator is stopped, depending on an output from the misfire-detecting means.

Preferably, the control means controls the operation of the oil pressure supply control valve such that the supply of the oil pressure to the hydraulic actuator is stopped when a first predetermined time period has elapsed after the supply of the oil pressure to the hydraulic actuator was started.

According to this preferred embodiment, oil pressure is continuously supplied to the hydraulic actuator until the predetermined time period has elapsed after the start of the supply of oil pressure. Therefore, it is possible to start or crank the engine reliably by setting the predetermined time period to a time period allowing the engine rotational speed to be positively increased to the desired rotational speed at which the engine performs its self-sustaining operation. Further, because the supply of oil pressure to the hydraulic actuator is stopped when the first predetermined time period has elapsed, even if the engine rotational speed does not reach the desired rotational speed due to a failure or breakdown of the engine, it is possible to utilize the oil pressure within the accumulator efficiently without wasting the same.

The start control system further comprises engine temperature-detecting means for detecting an engine temperature of the engine, and the first predetermined time period is set to be longer as the detected engine temperature is lower.

In general, when the engine temperature of the engine is low, viscous friction is large, and hence, the responsivity of the hydraulic actuator is low, which makes it difficult to start the engine. Therefore, according to the above preferred embodiment, the time period over which the hydraulic actuator is driven is set to be longer as the engine temperature is lower, whereby the engine can be started properly according to the temperature.

Preferably, the start control system further comprises:
a starter switch,
manual operation-determining means for determining whether or not a driver has operated the starter switch after stoppage of the engine,
start intention-determining means for determining whether or not the driver has an intention to start a vehicle on which the engine is installed, based on operating conditions of the engine after the stoppage of the engine, and
engine rotational speed-detecting means for detecting an engine rotational speed of the engine, and
when the manual operation-determining means determines that the starter switch has been operated, the control means controls the operation of the oil pressure supply control valve such that the supply of the oil pressure to the hydraulic actuator is stopped when the detected engine rotational speed has exceeded a third predetermined rotational speed after the supply of the oil pressure to the hydraulic actuator was started, while when the start intention-determining means determines that the driver has the intention to start the vehicle, the control means controls the operation of the oil pressure supply control valve such that the supply of the oil pressure to the hydraulic actuator is stopped when the detected engine rotational speed has exceeded a fourth predetermined rotational speed lower than the third predetermined rotational speed after the supply of the oil pressure to the hydraulic actuator was started.

According to this preferred embodiment, it is possible not only to manually start the engine after the stoppage of the same, by operation of a starter switch by the driver, but also to automatically start the engine based on the operating conditions of the same, in response to the driver's intention to start the vehicle. In an internal combustion engine of this type which can be automatically restarted after a stoppage, a stop time period before the restart of the engine is generally shorter than a stop time period before the manual start of the engine, and hence, the engine temperature is higher, making the engine easier to start. Therefore, by setting the predetermined rotational speed as a desired rotational speed for the automatic restart to be lower than that for the manual start, it is possible to ensure excellent startability of the engine for both the automatic restart and the manual start. Moreover, by setting the predetermined rotational speed to a low speed at the restart, it is possible to further shorten the time period for supplying oil pressure to the hydraulic actuator.

More, preferably, the start control system further comprises a stop time period-determining means for determining whether or not a stop time period over which the engine has been in stoppage before a start of the engine is longer than a predetermined time period, and the fourth predetermined rotational speed is set depending on determination of the stop time-determining means.

Preferably, the start control system further comprises:
a starter switch,
manual operation-determining means for determining whether or not a driver has operated the starter switch after stoppage of the engine, and
start intention-determining means for determining whether or not the driver has an intention to start a vehicle on which the engine is installed, based on operating conditions of the engine after the stoppage of the engine, and
when the manual operation-determining means determines that the starter switch has been operated, the control means controls the operation of the oil pressure supply control valve such that the supply of the oil pressure to the hydraulic actuator is stopped when a second predetermined time period has elapsed after the supply of the oil pressure to the hydraulic actuator was started, while when the start intention-determining means determines that the driver has the intention to start the vehicle, the control means controls the operation of the oil pressure supply control valve such that the supply of the oil pressure to the hydraulic actuator is stopped when a third predetermined time period which is shorter than the second predetermined time period has elapsed after the supply of the oil pressure to the hydraulic actuator was started.

As described hereinbefore, in an internal combustion engine of the type which can be automatically restarted after a stoppage, the engine is generally easier to start at the time of restart than at the time of manual start, and hence a time period required for the restart of the engine is shorter. Therefore, according to this preferred embodiment, the time period over which the hydraulic actuator is driven for the restart of the engine is set to be shorter than that for the manual start, whereby excellent startability of the engine can be ensured for both the restart and the manual start. Further, the embodiment makes it possible to shorten the time period for supplying oil pressure to the hydraulic actuator, thereby reducing electric power consumed by the electric motor.

More preferably, the start control system further comprises oil pressure-determining means for determining whether or not the oil pressure accumulated in the accumulator is sufficient for starting the engine, and pressure control means for controlling the electric motor such that the electric motor drives the oil pump until the oil pressure accumulated in the accumulator becomes sufficient for starting the engine, when the oil pressure-determining means determines that the oil pressure accumulated in the accumulator is not sufficient for starting the engine.

The above and other objects, features, and advantages of the invention will become apparent from the following detailed description taken in conjunction with the accompanying drawings.

DETAILED DESCRIPTION OF THE PREFERRED EMBODIMENT

Figure 1:
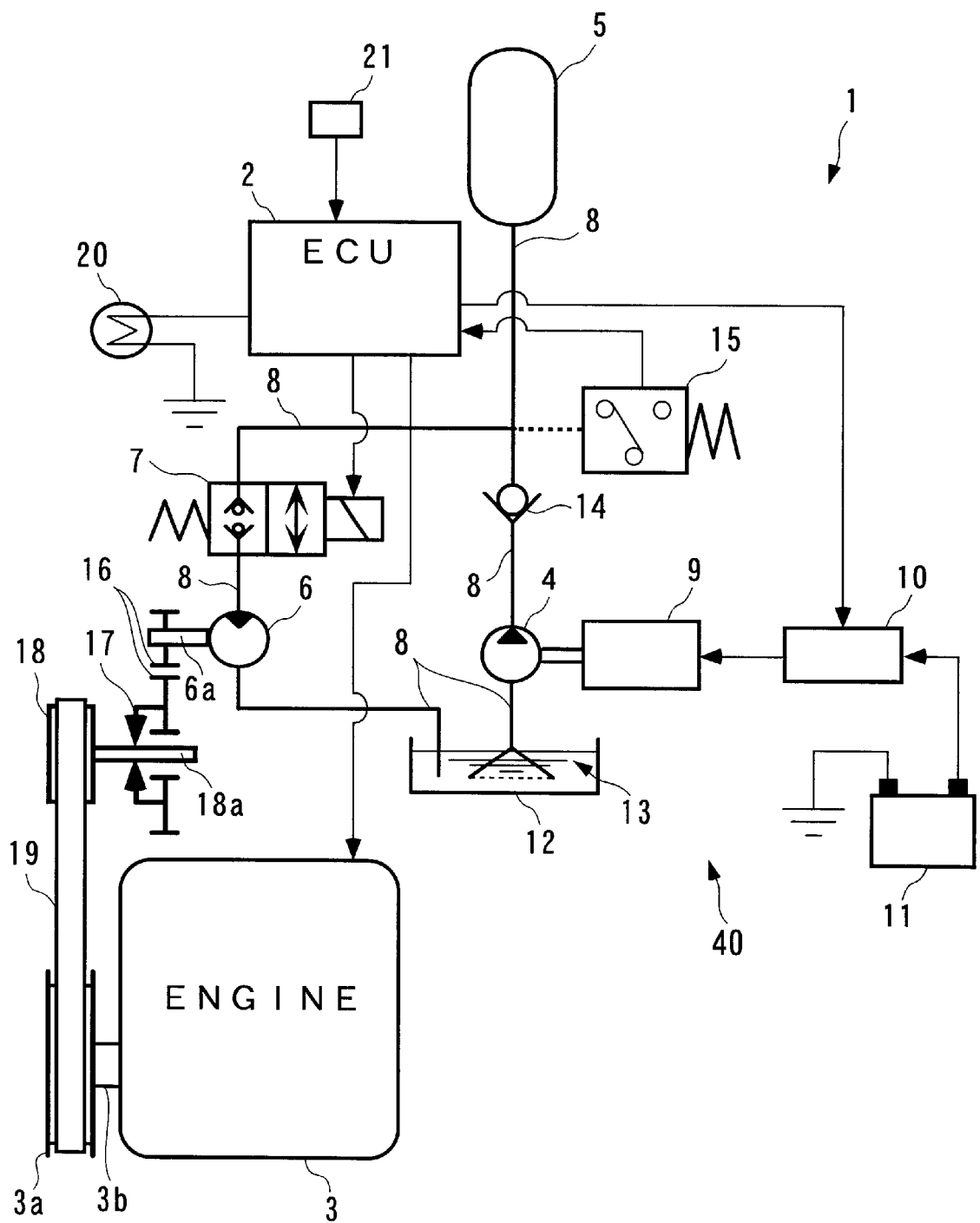
FIG. 1 is a view schematically showing the whole arrangement of a start control system for an internal combustion engine, according to an embodiment of the invention.

The invention will now be described in detail with reference to the drawings showing a preferred embodiment thereof Referring first to FIG. 1, there is schematically shown the entire arrangement of a start control system for an internal combustion engine, according to a preferred embodiment of the invention. As shown in the figure, the control system 1 includes an ECU 2 (control means, engine rotational speed-detecting means, stop time period-determining means, manual operation-determining means, start intention-determining means). As described in detail hereinafter, the ECU 2 controls start, stoppage, and restart of the internal combustion engine 3 (hereinafter simply referred to as "the engine 3"), in response to an engine start operation by the driver and in dependence on operating conditions of the engine 3.

The engine 3 is a four-cylinder four-cycle engine equipped with an automatic transmission mechanism, not shown. The automatic transmission mechanism is formed by an electronically controlled 4-speed automatic transmission mechanism with an over-drive gear, and can be selectively shifted to any one of six shift positions (shift ranges), i.e. an L range, a 2-range, a D range, an N range, an R range, and a P range. When the automatic transmission mechanism is in the L range, any one of a 1-speed gear and a 2-speed gear is automatically selected according to the operating condition of the vehicle. Similarly, in the 2-range, any one of the 1-speed gear, the 2-speed gear, and a 3-speed gear is selected, while in the D range, any one of the 1-speed to 3-speed gears and a 4-speed gear (over-drive gear) is selected. Further, in the R range, a reverse gear is selected.

The start control system 1 further includes an oil pump 4, an accumulator 5, a hydraulic motor 6 (hydraulic actuator), and an electromagnetic valve 7 (oil pressure supply control valve). The oil pump 4, the accumulator 5, the hydraulic motor 6, and the electromagnetic valve 7 are connected to each other by an oil passage 8 formed by metal pipes or the like, to form a hydraulic circuit 40.

Connected to the oil pump 4 is an electric motor 9 (hereinafter simply referred to as "the motor 9") for driving the oil pump 4. The motor 9 is connected to a battery 11 via a relay 10. The relay 10 is connected to the ECU 2, for electrically connecting between the battery 11 and the motor 9 or disconnecting one from the other. The operation of the relay 10 permits or inhibits supply of electric power from the battery 11 to the motor 9, whereby the oil pump 4 is driven for operation or stopped.

The oil pump 4 has an inlet port thereof connected to a reserve tank 12 via a segment of the oil passage 8, for drawing in oil 13 by suction from the reserve tank 12 during its operation. Another segment of the oil passage 8 extending from the outlet port of the oil pump 4 has a check valve 14 arranged in an intermediate portion thereof. This segment of the oil passage 8 is divided into two branch channels at a location downstream of the check valve 14. One of the branch channels is connected to the accumulator 5, and the other to the hydraulic motor 6. The electromagnetic valve 7 is arranged in an intermediate portion of the latter branch channel. The accumulator 5 for accumulating oil pressure delivered from the oil pump 4 has a capacity for a sufficient amount of oil pressure required for carrying out two consecutive engine start operations, as described in detail hereinafter. As long as the electromagnetic valve 7 is held in the closed state, the oil pressure accumulated in the accumulator 5 is held constant by the check valve 14 without being reduced.

Further, arranged in the segment of the oil passage 8 between the accumulator 5 and the check valve 14 is a pressure switch 15 electrically connected to the ECU 2. The pressure switch 15 carries out ON/OFF operation in response to changes in oil pressure accumulated in the accumulator 5. More specifically, the pressure switch 15 supplies an OFF signal to the ECU 2 when the oil pressure is equal to or larger than a predetermined pressure (e.g. 300 atm pressure), and supplies an ON signal when the oil pressure is below the predetermined pressure.

The electromagnetic valve 7 which is a non-leak cut-off valve is also electrically connected to the ECU 2. The electromagnetic valve 7 is of a normally-closed type and driven by the ECU 2 to open the oil passage 8 extending from the inlet port of the hydraulic motor 6, whereby oil pressure is supplied to the hydraulic motor 6 from the accumulator 5.

The hydraulic motor 6 is formed. e.g., by an axial piston motor which is driven for rotation by the supply of oil pressure from the accumulator 5. The hydraulic motor 6 has a rotational shaft 6a connected to a reduction gear mechanism 16. The reduction gear mechanism 16 is connected to a rotational shaft 18a of a timing pulley 18 via a one-way clutch 17, and the timing pulley 18 to a timing pulley 3a of the engine 3 via a toothed timing belt 19. Further, the timing pulley 3a is attached to an end of a crankshaft 3b. According to the above construction, during the start of the engine 3, the hydraulic motor 6 is driven to transmit torque thereof to the crankshaft 3b, whereby the crankshaft 3b is driven at a predetermined reduction gear ratio (e.g. 5:1). On the other hand, during the operation of the engine 3, torque of the crankshaft 3b is inhibited from being transmitted to the hydraulic motor 6 by the action of the one-way clutch 17.

Further, connected to the ECU 2 is a charge lamp 20 which is arranged on an instrument panel, not shown. As described in detail hereinafter, when an engine start operation cannot be carried out due to insufficiency of the oil pressure accumulated in the accumulator 5, the charge lamp 20 is lighted to notify the driver of the fact.

Figure 2:
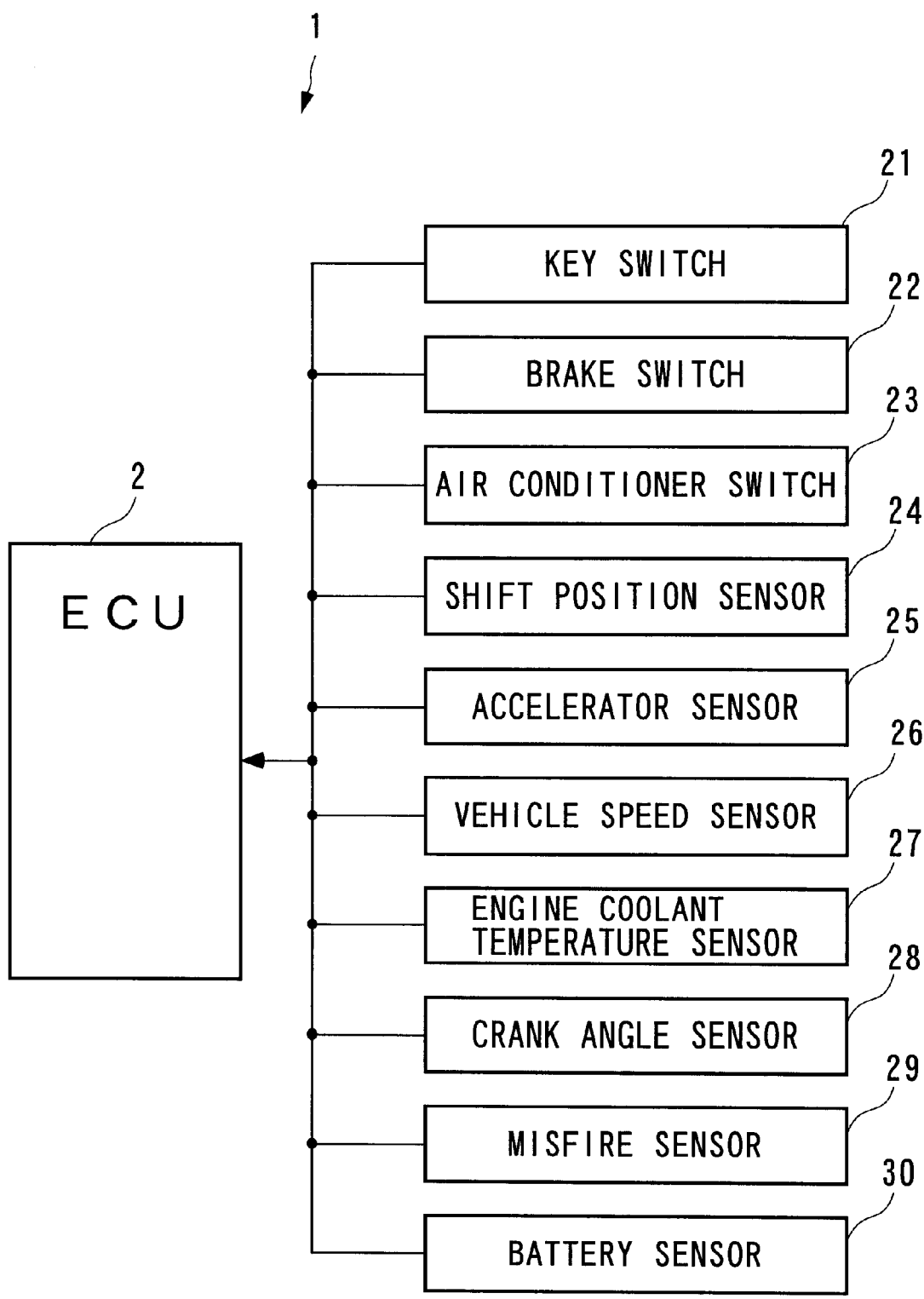
FIG. 2 is a block diagram of an ECU and various switches and sensors connected thereto of the FIG. 1 start control system.

As shown in FIG. 2, three switches 21 to 23 and seven sensors 24 to 30, referred to hereinafter, are also connected to the ECU 2. A key switch (starter switch) 21 is mounted to a steering column, not shown, for detecting that an ignition key, not shown, inserted into a key hole, not shown, is in the OFF position, the ACCESSORY position, the ON position, or the START position, and supplying a signal indicative of the sensed key position to the ECU 2.

A brake switch 22 is provided in a brake pedal mechanism, not shown. When a brake pedal, not shown, is stepped on by an amount equal to or larger than a predetermined amount, the brake switch 22 supplies an ON signal to the ECU 2, and otherwise, i.e. when the brake pedal is not stepped on by such an amount, it supplies an OFF signal to the same.

An air conditioner switch 23 is mounted to an air conditioner, not shown. The air conditioner switch 23 supplies an ON signal to the ECU 2 during operation of the air conditioner, and otherwise, i.e. during stoppage of the air conditioner, it supplies an OFF signal to the same.

A shift position sensor 24 is provided in the automatic transmission mechanism, for detecting which one of the aforementioned six shift positions a shift lever, not shown, is placed in and supplying a signal indicative of the sensed shift lever position to the ECU 2.

An accelerator sensor 25 is arranged at an accelerator mechanism (accelerator), not shown. When an accelerator pedal, not shown, of the accelerator mechanism is stepped on, the accelerator sensor 25 detects a stepping amount of the accelerator pedal (a degree of accelerator pedal opening) and supplies a signal indicative of the sensed stepping amount to the ECU 2. The ECU 2 controls the opening of a throttle valve, not shown, arranged in an intake pipe, not shown, in response to the signal from the accelerator sensor 25.

A vehicle speed sensor 26 which is mounted to an axle, not shown, of the automotive vehicle is formed of a magnet rotor, not shown, and an MRE (magnetic resistance element) pickup, not shown. The vehicle speed sensor 26 detects the vehicle speed VP, i.e. the traveling speed of the vehicle and supplies a signal indicative of the sensed vehicle speed VP to the ECU 2.

An engine coolant temperature sensor 27 (engine temperature-detecting means), a crank angle position sensor 28 (engine rotational speed-detecting means), and a misfire sensor 29 are arranged in the engine 3. The engine coolant temperature sensor 27 is mounted in the cylinder block of the engine 3, for sensing an engine coolant temperature TW which is the temperature of an engine coolant circulating within the cylinder block of the engine 3 and supplying a signal indicative of the sensed engine coolant temperature TW to the ECU 2. The crank angle position sensor 28 is formed of a magnet rotor and an MRE pickup, for sensing the rotational angle of the crankshaft 3b of the engine 3 and generating CRK signal pulses in accordance with rotation of the crankshaft 3b. The CRK signal is indicative of the sensed rotational angle of the crankshaft 3b, and each pulse thereof is generated whenever the crankshaft 3b rotates through a predetermined angle and supplied to the ECU 2. The ECU 2 determines the rotational speed of the engine 3 (hereinafter referred to as "the engine rotational speed NE"), based on the CRK signal.

The misfire sensor 29 for sensing a misfire occurring within a combustion chamber of the engine 3 is formed of two electrodes, not shown, projecting into the combustion chamber and supplies a signal based on an ion current flowing between the two electrodes to the ECU 2. The ECU 2 determines whether or not a misfire has occurred, based on the signal from the sensor 29.

A battery sensor 30 is mounted to the battery 11, for detecting values of a charge current and a discharge current flowing in and from the battery 11 and supplies signals indicative of the sensed values to the ECU 2. The ECU 2 calculates the total amounts of the charge and discharge of the battery 11 from the signals supplied from the battery sensor 30, and determines the remaining electric charge level of the battery 11, based on the results of the calculation.

The ECU 2 is formed by a microcomputer, not shown, including a CPU, a RAM, a ROM, and an I/O interface. The signals from the switches 15 and 21 to 23 and the sensors 24 to 30 are each input to the ECU 2, where they are subjected to A/D conversion and waveform shaping at the I/O interface, and then input into the CPU. The CPU samples these signals with predetermined timing and updates the values of the signals stored in the RAM. Further, the CPU is responsive to the updated values and performs various arithmetic operations based on control programs stored in the ROM with reference to flag values and calculation values, referred to hereinafter, stored in the RAM. More specifically, as described in detail hereinafter, the ECU 2 executes a manual start control process, an idling stop control process, a restart control process, and a manual stop control process. Further, the ECU 2 controls pressure accumulating operation of the aforementioned hydraulic circuit 40, as described below.

Now, brief description will be made of the pressure accumulating operation of the hydraulic circuit 40. First, when the oil pressure accumulated in the accumulator 5 is below the predetermined pressure, the pressure switch 15 is ON, whereby the electromagnetic valve 7 is held in the OFF state, and electric power is supplied to the motor 9 from the battery 11. As a result, the motor 9 is operated to drive the oil pump 4. The oil pump 4 draws in the oil 13 by suction from the reserve tank 12 and then delivers the same toward the accumulator 5 and the electromagnetic valve 7. At this time, the oil passage 8 is closed by the electromagnetic valve 7, and hence the oil 18 continuously delivered into the closed oil passage 8 by the oil pump 4 increases the oil pressure within the oil passage 8. Thus, the increased oil pressure is accumulated in the accumulator 5.

When the oil pressure accumulated in the accumulator 5 becomes equal to or higher than the predetermined pressure, the pressure switch 15 is switched from the ON state to the OFF state, whereby the power supply to the motor 9 is stopped, and hence the operation of the oil pump 4 is also stopped. At this time, the check valve 14 is operated to prevent the oil pressure within the accumulator 5 from being reduced.

Then, when the start control process and the restart control process, both described in detail hereinafter, are executed in the state of the oil pressure accumulated within the accumulator 5 being equal to or higher than the predetermined pressure, the electromagnetic valve 7 opens the oil passage 8, whereby oil pressure is supplied to the hydraulic motor 6 from the accumulator 5. As a result, the oil pressure within the accumulator 5 lowers, and hence the pressure switch 15 is switched from the OFF state to the ON state, whereby the operation for accumulating oil pressure in the accumulator 5 is carried out again. As described above, in the hydraulic circuit 40, when the pressure switch 15 is turned on, the accumulation of oil pressure in the accumulator 5 is carried out irrespective of whether or not the engine 3 is in operation, whereby the oil pressure within the accumulator 5 is controlled to the predetermined pressure or higher.

In the following, the manual start control process executed by the ECU 2 will be described in detail with reference to a flowchart shown in FIGS. 3 and 4. The manual start control process starts to be executed when the driver inserts the ignition key into the key hole and turns the same to the ON position.

Now, the flow of the control process will be described from a time point immediately after the ignition key having been turned to the ON position. First, at a step S1, it is determined by the output from the key switch 21 whether or not the ignition key is in the START position. If the answer to the question of the step S1 is negative (No), i.e. if the ignition key is not in the START position, the step S1 is repeatedly carried out.

On the other hand, if the answer to the question of the step S1 is affirmative (Yes), i.e. if the ignition key is in the START position, the program proceeds to a step S2, wherein it is determined whether or not the shift position is the P or N range and whether or not the engine rotational speed NE is equal to "0". If the answer to the question is negative (No), i.e. if the shift position is a range other than the P and N ranges, or if the engine rotational speed NE is not equal to "0", the program returns to the step S1, wherein the step S1 is executed again. If the answer to the question of the step S2 is affirmative (Yes), i.e. if the shift position is the P or N range and the engine rotational speed NE is equal to "0", the program proceeds to a step S3, wherein it is determined whether or not the pressure switch 15 is in the OFF state.

If the answer to the question of the step S3 is affirmative (Yes), i.e. if the oil pressure accumulated in the accumulator 5 is equal to or higher than the predetermined pressure, a flag FL1 is set to "0" at a step S4, and then the program proceeds to a step S6. If the present routine is executed for the first time, normally the oil pressure accumulated in the accumulator 5 is equal to or higher than the predetermined pressure, and the pressure switch 15 is held in the OFF state. Therefore, the answer to the question of the step S3 is normally affirmative (Yes), and hence the step S4 is executed. The flag FL1 is set to "0" in the manual stop control process carried out when the ignition key is turned to the OFF position, which will be described in detail hereinafter. Further, the flag FL1 is incremented by "1" at a step S12 also described hereinafter.

On the other hand, if the answer to the question of the step S3 is negative (No), the program proceeds to a step S5, wherein it is determined whether or not the flag FL1 assumes "1" or "0". If the answer to the question of the step S5 is affirmative (Yes), i.e. if the present routine is being executed for the first time or for a second time, the program proceeds to the step S6.

At the step S6 following the step S4 or S5, it is determined whether or not the engine coolant temperature TW is below a predetermined value TW1 (e.g. −15° C.). If TW≧TW1 holds at the step S6, an electromagnetic valve-driving time period tc (first predetermined time period, second predetermined time period: in units of seconds) over which the electromagnetic valve 7 is driven is set to "t1+0.03·FL1" at a step S7, whereas if TW<TW1 holds, the electromagnetic valve-driving time period tc is set to "t1+0.02+0.03·FL1" at a step S8. Then, the program proceeds to a step S9 in FIG. 4, wherein the electromagnetic valve 7 is driven (turned on) to open the oil passage 8. As a result, the oil pressure is supplied to the hydraulic motor 6 from the accumulator 5, whereby the hydraulic motor 6 is driven to rotate the crankshaft 3b. At the same time, the air-fuel mixture is supplied to combustion chambers, and sparks are produced by spark plugs, not shown, in the respective combustion chambers, whereby the engine 3 is started.

In general, in a hydraulic circuit 40 of a type employed in the present embodiment, even after it is instructed that the electromagnetic valve 7 be deenergized to stop the supply of oil pressure to the hydraulic motor 6, the hydraulic motor 6 continues to drive the engine 3 e.g. due to a time lag in operation of the electromagnetic valve 7, whereby the engine rotational speed NE is further increased. Therefore, the value t1 represents a predetermined time period which was determined from experiments in view of the further increase in the engine rotational speed NE, and is set to such a value (e.g. 0.14 seconds) that ensures that the engine 3 can be reliably started when the electromagnetic valve 7 is held in the energized state over the electromagnetic valve-driving time period tc calculated as above.

After execution of the step S9, the program proceeds to a step S10, wherein it is determined whether or not the electromagnetic valve-driving time period tc has elapsed. If the electromagnetic valve-driving time period tc has not elapsed at the step S10, the electromagnetic valve 7 continues to be held in the open state. Then, when the electromagnetic valve-driving time period tc has elapsed, the program proceeds to a step S11, wherein the driving of the electromagnetic valve 7 is stopped (i.e. the valve 7 is turned off). Further, the program proceeds to the step S12, wherein the present flag FL1 is incremented by "1" (FL=FL+1). At the step S12, in the present case, the flag FL1 is set to "1".

Thereafter, the program proceeds to a step S13, wherein it is determined whether or not a predetermined time period ta has elapsed after the electromagnetic valve 7 was turned off. If the predetermined time period ta has not elapsed, the step S13 is repeatedly carried out, whereas if the predetermined time period ta has elapsed, the program proceeds to a step S14, wherein it is determined whether or not the engine rotational speed NE is not equal to "0". If the engine rotational speed NE is not equal to "0" at the step S14, it is judged that the engine 3 has been started, and the program proceeds to a step S15, wherein the idling stop control process, described in detail hereinafter, is executed. That is, the predetermined time period ta applied at the step S13 is a standby time required for determining correctly after completion of a transient operation of the engine 3 following cranking of the same whether or not the engine 3 has been actually started. The predetermined time period ta is set e.g. to 2 seconds.

Figure 3:
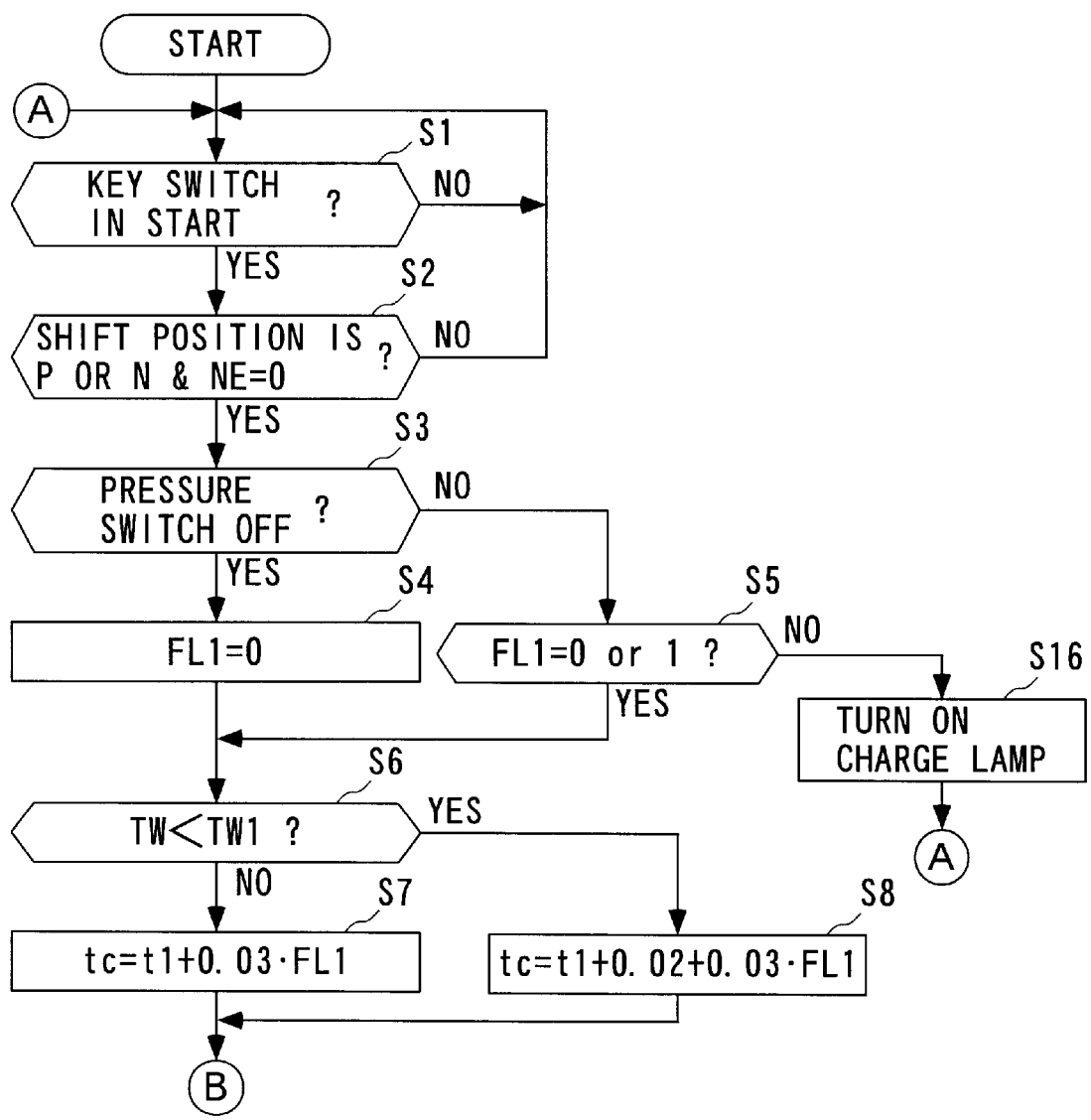
FIG. 3 is a flowchart showing a routine for carrying out a normal start control process by using an ignition key.
Figure 4:
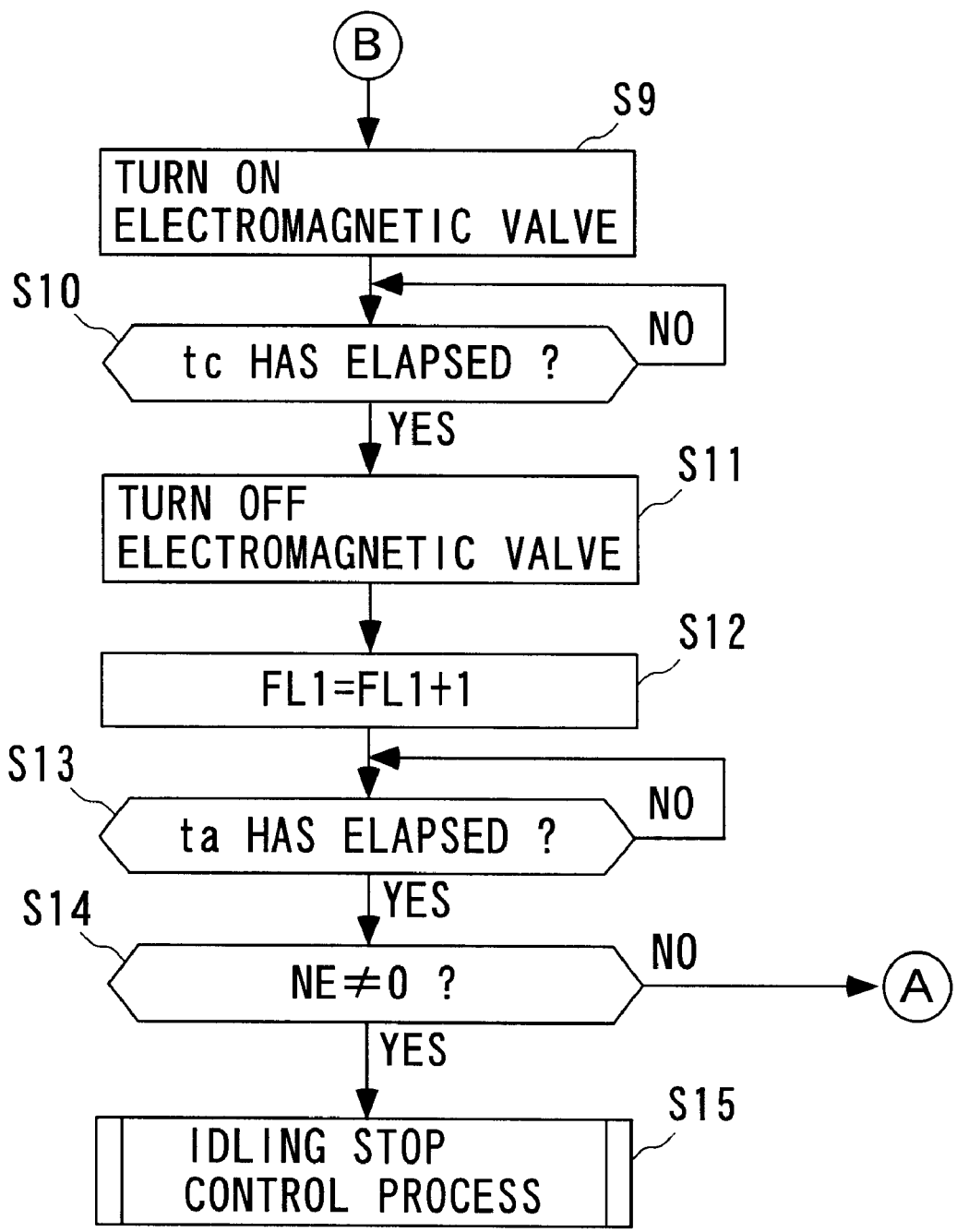
FIG. 4 is a continued part of the FIG. 3 flowchart.

On the other hand, if the engine rotational speed NE is equal to "0" at the step S14, it is judged that the engine 3 has not been started, and the program returns to the step S1 in FIG. 3 to execute the present routine for a second time. In this case, since the oil pressure within the accumulator 5 was already used when the routine was executed for the first time, the oil pressure is normally below the predetermined pressure, and hence the pressure switch 15 is in the ON state. Therefore, in execution of the routine for the second time, the answer to the question of the step S3 is negative (No), so that the program proceeds to the step S5, wherein it is determined whether or not the flag FL assumes "1" or "0".

Because the flag FL1 was set to "1" at the step S12 in execution of the routine for the first time, the answer to the question of the step S5 is affirmative (Yes). Consequently, the steps S6 to S14 are executed in the same manner as executed for the first time. When the routine is executed for the second time, FL1=1 holds, so that the electromagnetic valve-driving time period tc is set to be longer at the step S7 or S8 than when the routine was executed for the first time. The reason for this is that, as described above, in the second-time execution of the present routine, a longer time period is required for starting the engine 3, due to a decrease in the oil pressure.

As described above, irrespective of whether the pressure switch 15 is in the ON state or in the OFF state, the engine start operation is carried out twice by opening the electromagnetic valve 7. Further, since oil pressure which is sufficient for carrying out the engine start operation twice is normally accumulated in the accumulator 5, the engine 3 is normally started by the two consecutive executions of the start control process.

If the answer to the question of the step S14 is negative (No), i.e., if the engine is not started yet even after the routine of the start control process has been executed twice, the program returns to the step S1 so as to execute the present routine for a third time. When the present routine is executed for a third time, since the flag FL1 was set to "2" at the step S11 in the second-time execution of the routine, the answer to the question of the step S5 is negative (No). Therefore, the program proceeds to a step S16, wherein it is judged that the engine 3 is not ready for the engine start operation, and the charge lamp 20 is lighted, without carrying out engine start operation by opening the electromagnetic valve 7. Then, the program returns to the step S1 so as to execute the present routine for the fourth time similarly to the above. The routine may be executed even more times as required.

When the accumulation of oil pressure in the accumulator 5 is completed during execution of the present routine for the fourth time or even more number of times, and, hence, the pressure switch 15 is switched from the ON state to the OFF state, the answer to the question of the step S3 becomes affirmative (Yes), and the electromagnetic valve 7 is opened, whereby the above-described start control is carried out again by opening the electromagnetic valve 7. The manual start control process by the start control system 1 is thus executed.

As described above, the start control system 1 utilizes oil pressure generated by the motor 9, for starting the engine 3, so that even during stoppage of the engine 3, it is possible to operate the motor 9 to thereby accumulate oil pressure in the accumulator 5 in preparation for the next start of the engine 3. Therefore, as opposed to the conventional start control system using compressed air, the start control system 1 is capable of ensuring excellent startability of the engine 3 without causing a problem that the engine 3 cannot be cranked when it is started after stoppage.

Further, the utilization of oil pressure makes it possible to generate a higher pressure with ease, compared with the prior art using compressed air, and the entire accumulator 5 can be reduced in size, which contributes to making the start control system 1 compact in design. Moreover, because a hydraulic actuator such as the hydraulic motor 6 driven by oil pressure is generally capable of generating a large driving force, it is possible to increase the engine rotational speed NE during cranking of the engine 3 to a desired rotational speed which is higher than that in the prior art, e.g. a higher rotational speed than an idling rotational speed. At the same time, the large driving force makes it possible to shorten a time period which the engine 3 takes to reach the desired rotational speed, thereby reducing vibrations caused by the engine 3 during the start thereof.

Further, because the oil 13 used as a working medium is smaller than the air in volume change caused by pressure change, energy remaining in oil discharged from the system 1 is smaller than energy remaining in the air, which makes it possible to reduce noises produced during the discharge of the working medium into the reserve tank 12. For the same reason, it is also possible to avoid freezing which occurs when the air is used as a working medium and to prevent breakage of the system 1 due to the freezing. In addition, the system 1 is only required to be provided with the motor 9 generating torque for driving the oil pump 4 for rotation and the battery for driving the motor 9 in place of a large-sized electric motor and a large-capacity battery which are used in the conventional start control system applied to hybrid vehicles. This enables reduction of the size and weight of the system 1, thereby contributing to reduction of manufacturing costs of the same. The above features and advantages ensures high marketability of the system 1.

Further, in the system 1, when the engine coolant temperature TW is lower than the predetermined value TW1 at the step S6, which means that it takes a long time period to start the engine 3 due to large friction in the engine 3 and high viscous resistance of the oil 13, the electromagnetic valve-driving time period tc over which the electromagnetic valve 7 is driven is set at the step S8 to be longer than when TW≧TW1 holds, so as to enable the engine 3 to be started reliably. Moreover, since the electromagnetic valve 7 is turned off when the electromagnetic valve-driving time period tc has elapsed, even if the engine rotational speed NE does not reach the desired rotational speed due to a failure or breakdown of the engine 3, it is possible to utilize the oil pressure within the accumulator 5 efficiently without wasting the same.

Although in the present embodiment, the predetermined value TW1 is employed as a threshold value, and the electromagnetic valve-driving time period tc is selectively set to one of the two calculated values, this is not limitative, but a table formed based on a predetermined relationship between the engine coolant temperature TW and the electromagnetic valve-driving time period tc may be used to determine the electromagnetic valve-driving time period tc dependent on a sensed engine coolant temperature TW.

Figure 5A:
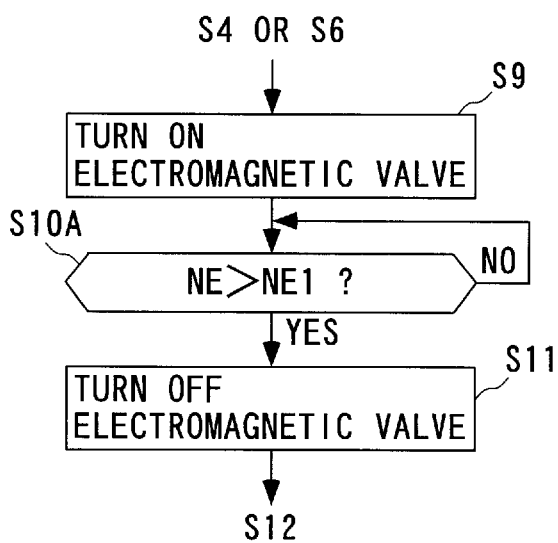
FIGS. 5A to 5C are flowcharts each showing a variation of steps S6 to S11 in FIGS. 3 and 4.
Figure 12:
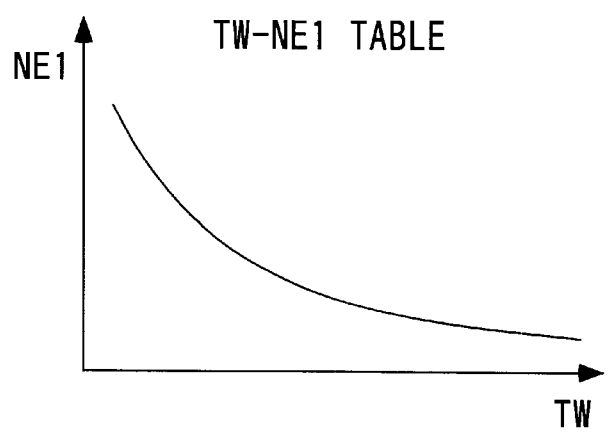
FIG. 12 is a diagram showing an example of a TW–NE1 table.

Further, although the electromagnetic valve 7 is controlled to be closed when the electromagnetic valve-driving time period tc has elapsed after it was opened, the electromagnetic valve 7 may be controlled, as shown in FIG. 5A, such that it is closed when the engine rotational speed NE exceeds a predetermined engine rotational speed NE1 (first engine rotational speed, third engine rotational by way of example is searched to determine a value of the predetermined engine rotational speed NE1, based on an engine coolant temperature TW sensed by the engine coolant temperature sensor 27. As shown in FIG. 12, in the TW–NE1 table, the predetermined engine rotational speed NE1 is set such that the value thereof becomes larger as the engine coolant temperature TW is lower.

The above control makes it possible to start the engine 3 while allowing for low startability of the engine 3 due to a low engine coolant temperature TW or high startability of the same owing to a high engine coolant temperature TW. In short, it is possible to start the engine 3 properly according to whether the startability of the engine 3 dependent on the engine coolant temperature TW before the start of the engine 3 is excellent or poor.

Figure 5C:
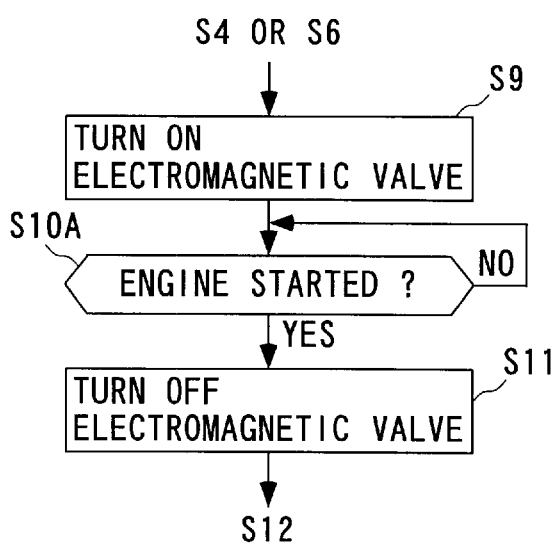

Further, a step S10C in FIG. 5C may be executed in place of the FIG. 5A step S10A so as to determine whether or not the engine 3 has actually been started. This determination is carried out based on the sensed engine rotational speed NE and the output from the misfire sensor 29. This control provides another reliable method of detection of the started state of the engine 3.

Figure 6:
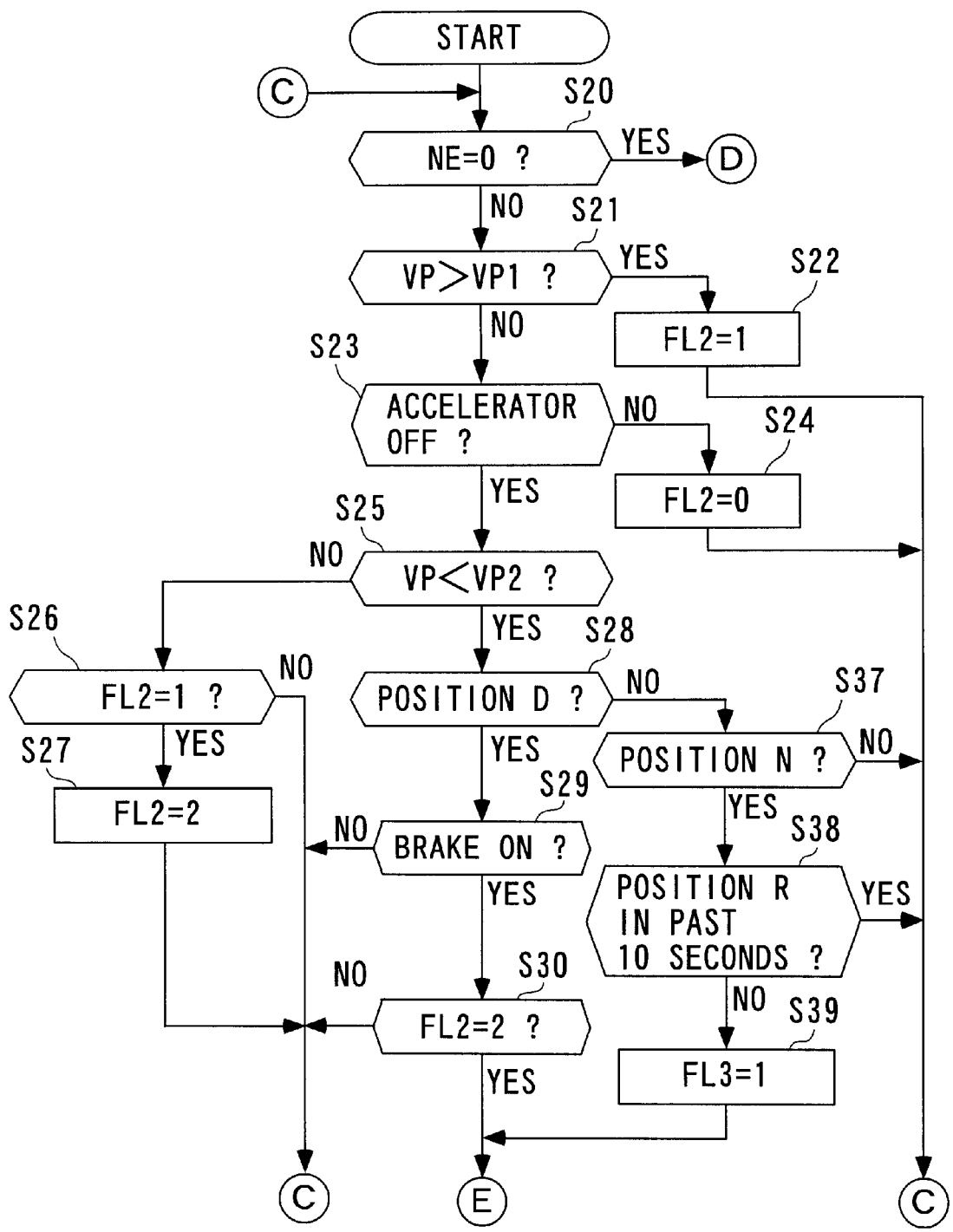
FIG. 6 is a flowchart showing a routine for carrying out an idling stop control process.

Next, description will be made, with reference to FIGS. 6 and 7, of the idling stop control process which is carried out at the step S15 in FIG. 4 after execution of the manual start control process. The idling stop control process is executed to automatically stop the engine 3, e.g., when the vehicle is standing by a railroad crossing.

In this process, first at a step S20, it is determined whether or not the engine rotational speed NE is equal to "0". If the answer to the question of the step is affirmative (Yes), i.e. if the engine rotational speed NE is equal to "0", it is judged that engine stalling has speed). More specifically, steps S9, S10A, and S11 shown in FIG. 5A are executed instead of the above-described steps S6 to S11. That is, the electromagnetic valve 7 is turned on at the step S9, and then, it is determined at the step S10A whether or not the engine rotational speed NE has exceeded the predetermined engine rotational speed NE1 (e.g. 700 rpm). If NE>NE1 holds at the step S10A, the electromagnetic valve 7 is closed at the step S11.

Generally, in the engine 3, as the engine coolant temperature TW is lower, the viscous resistance of lubricating oil becomes larger to increase viscous friction. Besides, the oil temperature within the hydraulic circuit 40 is low, and hence the responsivity of the hydraulic motor 6 is also low. However, according to the present embodiment, the electromagnetic valve 7 is controlled, as described above, such that it is held in the open state until the actual engine rotational speed NE has exceeded the predetermined engine rotational speed NE1, and therefore it is possible to increase the engine rotational speed NE reliably to the predetermined engine rotational speed NE1 regardless of the large viscous friction and the low responsivity of the hydraulic motor 6, which ensures excellent startability of the engine 3. Further, since the predetermined engine rotational speed NE1 is set, allowing for an increase in the engine rotational speed NE after it is instructed that the electromagnetic valve 7 be deenergized, waste of the hydraulic oil within the accumulator 5 can be prevented.

Figure 5B:
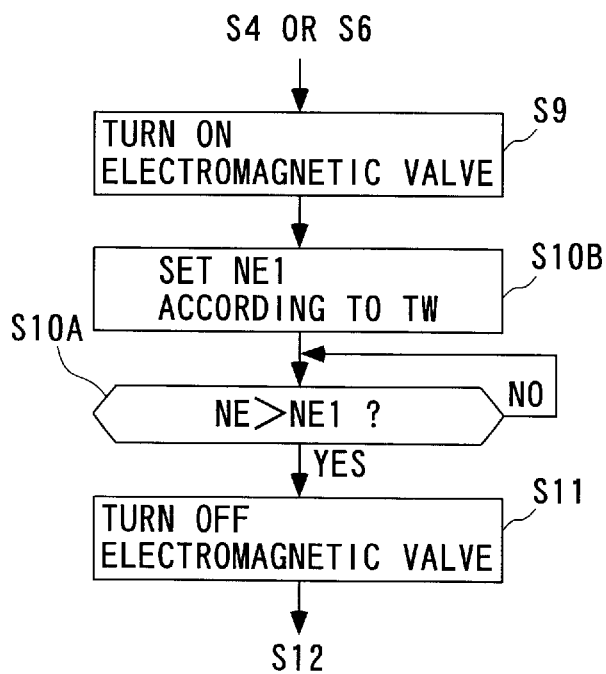

Moreover, as shown in FIG. 5B, the predetermined engine rotational speed NE1 appearing in FIG. 5A may be set depending on the engine coolant temperature TW. More specifically, as shown in FIG. 5B, a step S10B is executed between the steps S9 and S10A in FIG. 5A. At the step S10B, a TW–NE1 table which is represented in FIG. 12 as a graph occurred for some unexpected reason, and the program proceeds to a step S36, wherein the restart control process, described in detail hereinafter, is executed so as to automatically restart the engine 3.

On the other hand, if the answer to the question of the step S20 is negative (No), i.e. if the engine rotational speed NE is not equal to "0", the program proceeds to a step S21, wherein it is determined whether or not the vehicle speed VP is above a first predetermined vehicle speed VP1 (e.g., 20 km/h). If VP>VP1 holds at the step S21, a flag FL2 is set to "1" at a step S22, followed by the program returning to the step S20. On the other hand, if VP>VP1 holds, the program proceeds to a step S23, wherein it is determined, based on an output from the accelerator sensor 25, whether or not the accelerator is in the OFF state (i.e. whether or not the stepping amount of the accelerator pedal is below a predetermined amount).

If the accelerator is in the ON state at the step S23, the flag FL2 is set to "0" at a step S24, followed by the program returning to the step S20. On the other hand, if the accelerator is in the OFF state, the program proceeds to a step S25, wherein it is determined whether or not the vehicle speed VP is below a second predetermined vehicle speed VP2 (e.g., 10 km/h). If VP>VP2 holds at the step S25, the program proceeds to a step S26, wherein it is determined whether or not the flag FL2 assumes "1". If the flag FL2 assumes "1", it is set to "2" at a step S27, and then the program returns to the step S20, whereas if the flag FL2 does not assume "1", the program returns to the step S20 immediately.

On the other hand, if VP<VP2 holds at the step S25, the program proceeds to a step S28, wherein it is determined whether or not the shift position is the D range. If the shift position is the D range at the step S28, the program proceeds to a step S29, wherein it is determined, based on an output from the brake switch 22, whether or not the brake is in the ON state (i.e. whether the stepping amount of the brake pedal is equal to or larger than a predetermined amount). If the brake is not in the ON state at the step S29, the program returns to the step S20, whereas if the brake is in the ON state, the program proceeds to a step S30, wherein it is determined whether or not the flag FL2 assumes "2".

Figure 7:
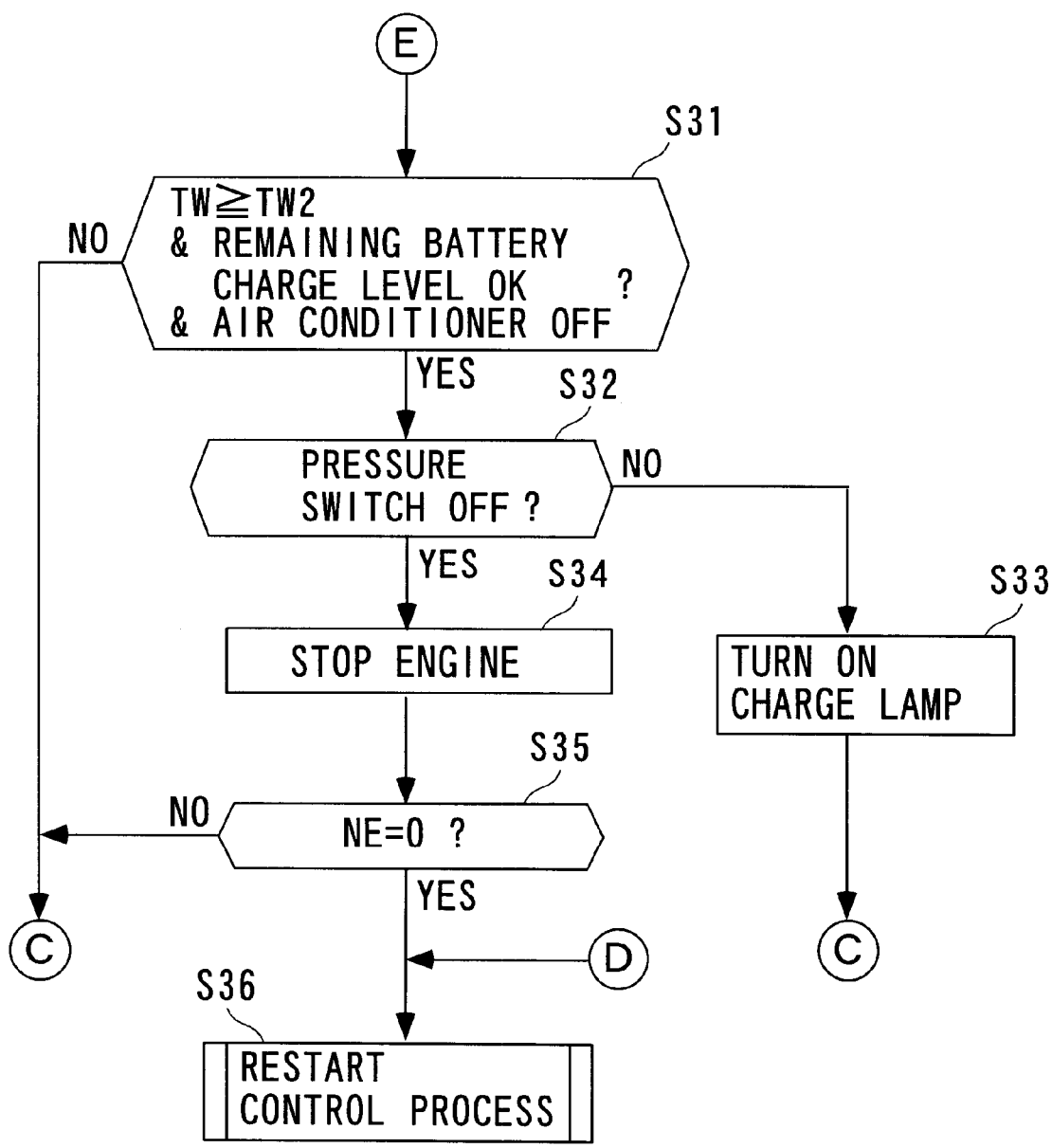
FIG. 7 is a continued part of the FIG. 6 flowchart.

If the flag FL2 does not assume "2" at the step S29, the program returns to the step S20, whereas if the flag FL2 assumes "2", it is judged that the vehicle speed VP has dropped from a higher value than the first predetermined vehicle speed VP1 to a smaller value than the second predetermined vehicle speed VP2, which means that the engine 3 is in a state allowing stoppage of idling, and the program proceeds to a step S31 in FIG. 7. At the step S31, it is determined whether or not three conditions are all satisfied that the engine coolant temperature TW is above a predetermined value TW2 (e.g. 60° C.), that the remaining electric charge level of the battery 11 is above a predetermined amount, and that the air conditioner is in the OFF state. If at least one of the three conditions is not satisfied at the step S31, the program returns to the step S20, whereas if the three conditions are all satisfied, the program proceeds to a step S32, wherein it is determined whether or not the pressure switch 15 is in the OFF state.

If the pressure switch 15 is in the ON state at the step S32, it is judged that the oil pressure accumulated in the accumulator 5 is insufficient and that the engine 3 cannot be restarted immediately when it is restarted after stoppage of the same, so that the charge lamp is turned on at a step S33 without stopping the engine 3, followed by the program returning to the step S20. On the other hand, if the pressure switch 15 is in the OFF state at the step S32, it is judged that sufficient oil pressure has been accumulated in the accumulator 5 and that the engine 3 can be restarted after stoppage of the same, so that the program proceeds to a step S34, wherein the engine 3 is stopped. More specifically, fuel injection by injectors, not shown, and ignition by the spark plugs, not shown, are stopped, and an idling control valve, not shown, is closed.

At the following step S35, it is determined whether or not the engine rotational speed NE is equal to "0". If the engine rotational speed NE is equal to "0" at the step S35, the program proceeds to the step S36, wherein the restart control process, described in detail hereinafter, is executed, whereas if the engine rotational speed NE is not equal to "0", the program returns to the step S20 to continue the execution of the present process.

If the shift position is not the D range at the step S28, the program proceeds to a step S37, wherein it is determined whether or not the shift position is the N range. If the shift position is not the N range at the step S37, the program returns to the step S20, whereas if the shift position is the N range, the program proceeds to a step S38, wherein it is determined whether or not the shift position was the R range during the past 10 seconds.

If it is determined at the step that the shift position was the R range during the past 10 seconds, it is judged that the vehicle is being driven e.g. to be put into a garage, and the program returns to the step S20 without the engine 3 being stopped. On the other hand, if the shift position was not the R range during the past 10 seconds, a flag FL3 is set to "1" at a step S39, followed by the program proceeding to the step S31. It should be noted that the flag FL3 is used in the restart control process, described in detail hereinbelow, which is executed at the step S36 in FIG. 7.

As described above in detail, in the idling stop control process, the engine 3 is not stopped unless the vehicle speed VP has dropped from a value above the first predetermined vehicle speed VP1 to a value below the second predetermined vehicle speed VP2 (<VP1), and the state in which the shift position is the D range, with the accelerator pedal released and the brake pedal stepped on is maintained all the while. This makes it possible to avoid frequent occurrence of engine stoppage in traffic congestion. Further, when the shift position is the N range, and if the shift position was the R range during the past 10 seconds, the engine 3 is prevented from being stopped, so that the driver can avoid an event of the engine 3 being stopped during driving of the vehicle for putting the same into a garage.

Figure 8:
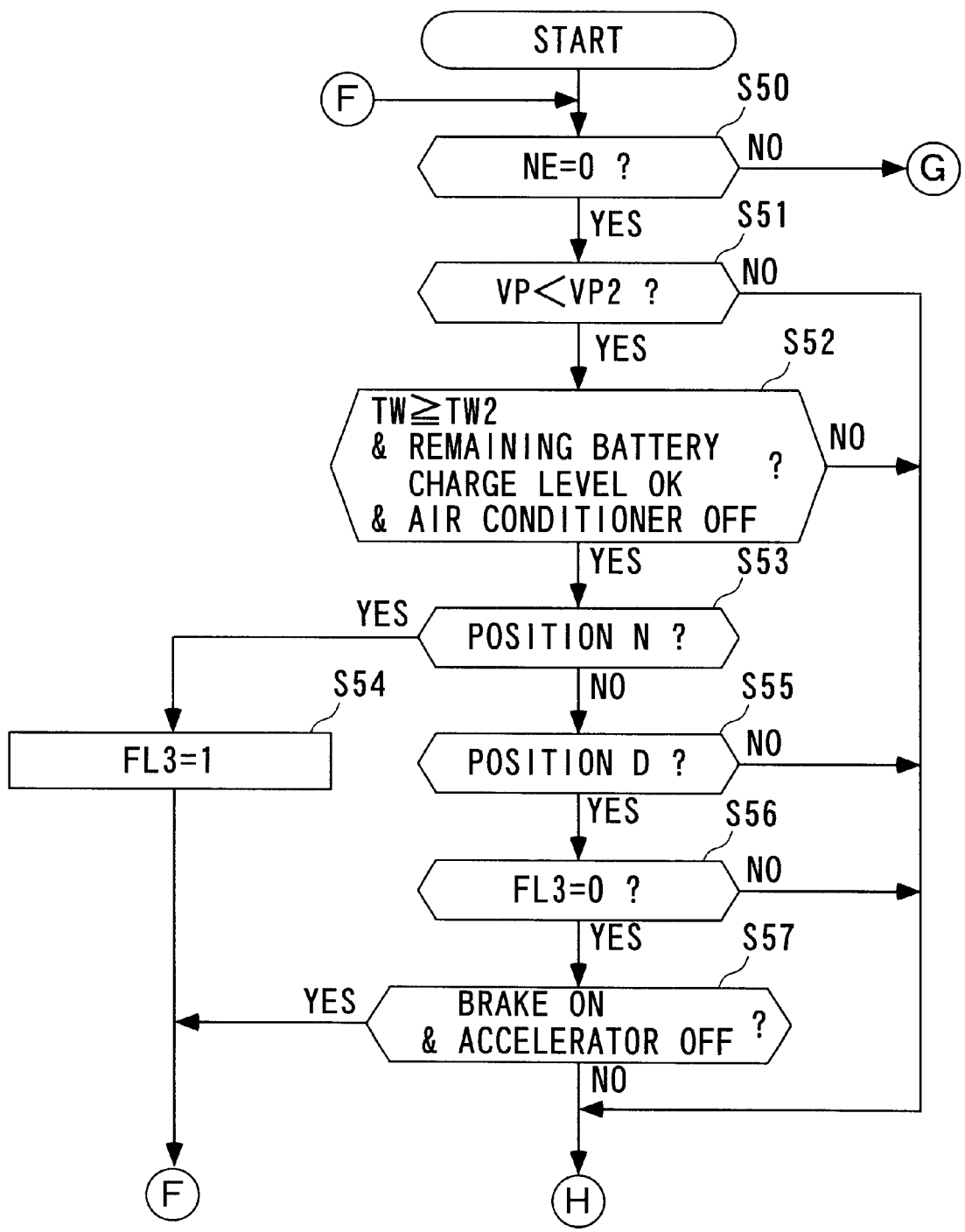
FIG. 8 is a flowchart showing a routine for carrying out a restart control process.

Next, description will be made, with reference to FIGS. 8 and 9, of the restart control process which is carried out at the step S36 in FIG. 7 after execution of the idling stop control process. The restart control process is executed to automatically restart the engine 3 after the engine 3 was stopped by the idling stop control process or when engine stalling has occurred due to some cause.

In this process, first at a step S50, it is determined whether or not the engine rotational speed NE is equal to "0". If the answer to the question of the step is negative (No), i.e. if the engine rotational speed NE is not equal to "0", it is judged that the engine 3 is in operation, which means that it is not required to carry out the present process, and the program proceeds to the step S67, wherein the idling stop control process is executed.

On the other hand, if the answer to the question of the step S50 is affirmative (Yes), i.e. if the engine rotational speed NE is equal to "0", the program proceeds to a step S51, wherein it is determined whether or not the vehicle speed VP is below the second predetermined vehicle speed VP2. If VP<VP2 holds at the step S51, the program proceeds to a step S52, wherein it is determined whether or not three conditions identical to those at the step S31 in FIG. 7 are all satisfied. If the three conditions are all satisfied at the step S52, the program proceeds to a step S53, wherein it is determined whether or not the shift position is the N range.

If the shift position is the N range at the step S53, the flag FL3 is set to "1" at a step S54, followed by the program returning to the step S50. On the other hand, if the shift position is not the N range, the program proceeds to a step S55, wherein it is determined whether or not the shift position is the D range. If the shift position is the D range at the step, the program proceeds to a step S56, wherein it is determined whether or not the flag FL3 assumes "0".

If the flag FL3 assumes "0" at the step S56, the program proceeds to a step S57, wherein it is determined whether or not the brake pedal is stepped on and the accelerator pedal is released. If the brake pedal is stepped on and the accelerator pedal is released, the program returns to the step S50, whereas if the brake pedal is released or if the accelerator pedal is stepped on, the program proceeds to a step S58 in FIG. 9.

Figure 9:
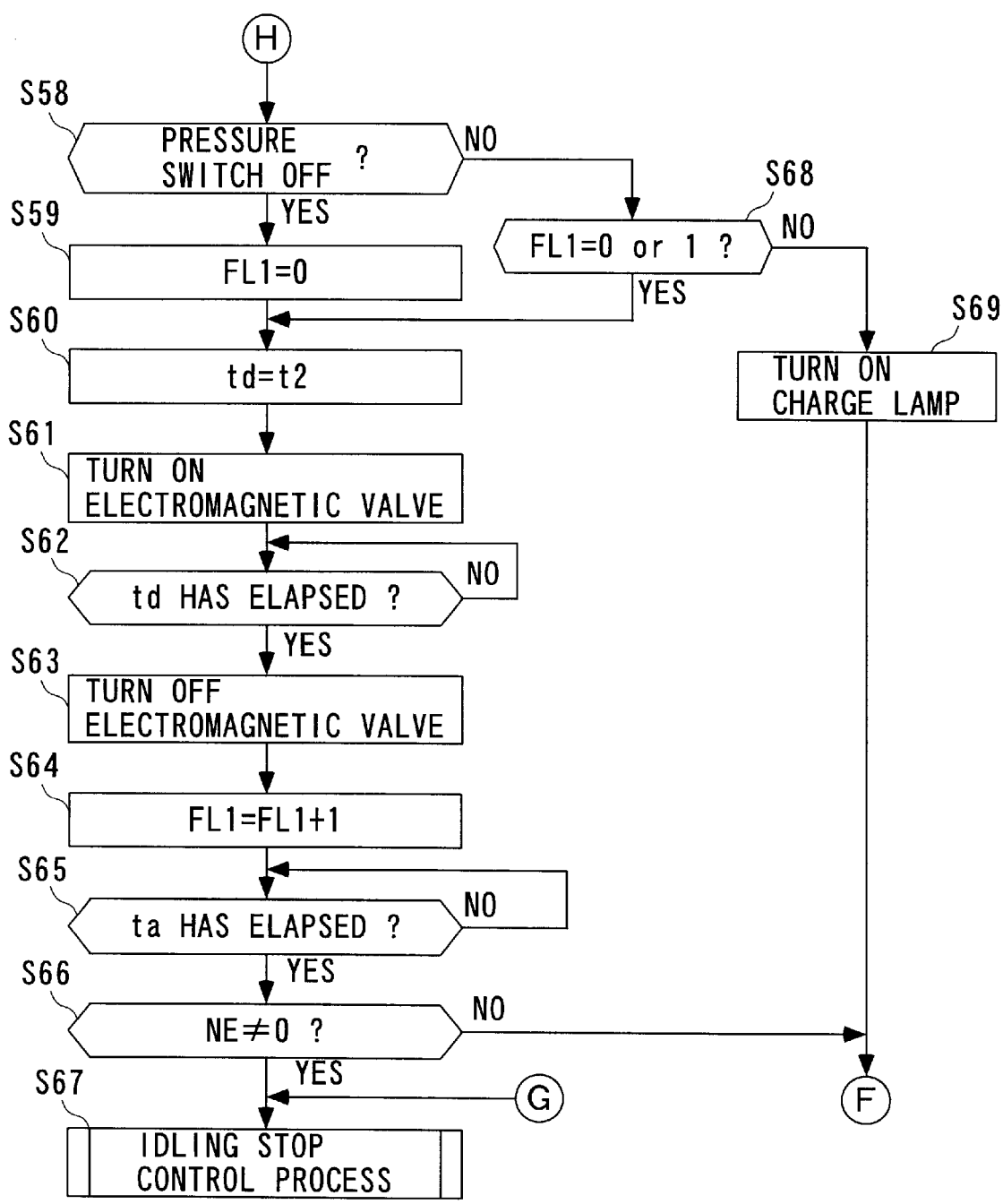
FIG. 9 is a continued part of the FIG. 8 flowchart.

Further, if VP≧VP2 holds at the step S51, if at least one of the three conditions is not satisfied at the step S52, if the shift position is not the D range at the step S55, or if the flag FL3 does not assume "0" at the step S56, the program also proceeds to the step S9 in FIG. 9.

Referring to FIG. 9, processing executed at the step S58 and the following steps S59 to S69 is similar to the processing executed at the steps S3 to S16 of the manual start control process, except steps for setting a value of an electromagnetic valve-driving time period td over which the electromagnetic valve 7 is driven, so that detailed description of the identical steps is omitted, and only the different points are explained below.

In the present process, the electromagnetic valve-driving time period td (third predetermined time period) is set to a predetermined value t2 at the step S60. This predetermined value t2 is set as a time period (e.g. 0.13 seconds) which is slightly shorter than the aforementioned value t1. One of the reasons why the electromagnetic valve-driving time period td is thus set is that at the restart of the engine 3, a stop time period over which the engine 3 has been in stoppage before the restart is shorter and hence a decrease in the engine coolant temperature TW is smaller than at the manual start of the engine 3, so that the engine 3 is easier to start, and hence, in general, the time period required for starting the engine 3 is short. Another reason is that since the engine 3 is automatically started for the restart without ignition key operation by the driver, reduction of noise produced by the restart of the engine 3 is desirable.

As described in detail hereinabove, the restart control process is executed by the start control system 1, whereby the engine 3 is automatically restarted. That is, the idling stop control process and the restart control process are automatically carried out, whereby after the engine 3 is automatically stopped, it is automatically restarted in dependence on predetermined operating conditions, including the vehicle speed VP, the engine coolant temperature TW, the remaining battery charge level, the operating state of the air conditioner, the shift position, the stepping amount of the brake pedal, and the stepping amount of the accelerator pedal. Thus, the driver is not required at all to carry out engine start operation after the idling of the engine 3 is automatically stopped e. g. when the driver is waiting for traffic lights to change, which ensures high marketability of the system 1.

Further, at the restart of the engine 3 at which a decrease in the engine coolant temperature TW is small, and hence the engine 3 can be started easily, the electromagnetic valve-driving time period td, i.e. time period over which the hydraulic motor 6 is driven is set to be shorter than the electromagnetic valve-driving time period tc for manual start (td<tc), so that excellent startability can be ensured for both the restart and the manual start of the engine 3. Further, since the time period for supplying oil pressure to the hydraulic motor 6 is shortened, consumption of electric power by the motor 9 can be reduced.

In general, in an automatic transmission mechanism, it is preferred from the viewpoint of fuel economy that a time period for disengaging or sliding the clutch is shortened. However, when this time period is shortened, engine stalling is liable to occur e.g. when the brake pedal is stepped on suddenly. According to the start control system 1 of the present embodiment, even when engine stalling occurs for the above reason, it is possible to restart the engine 3 in a short time period by utilizing the oil pressure. Therefore, the system 1 is capable of enhancing fuel economy while maintaining excellent driveability of the vehicle.

Figure 10A:
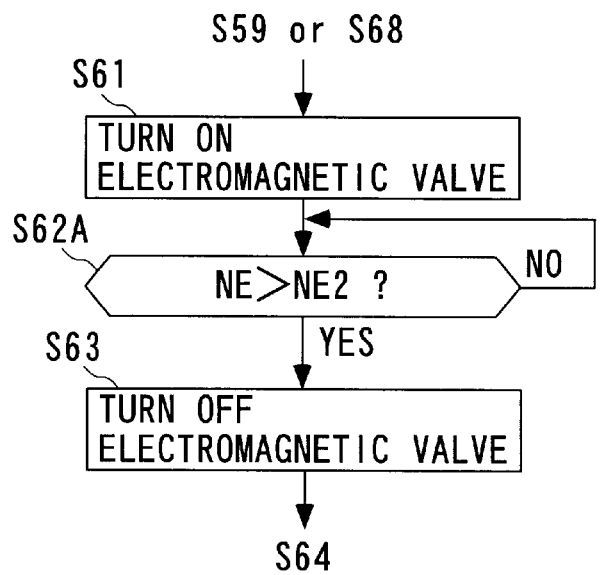
FIGS. 10A and 10B are flowcharts each showing a variation of steps S60 to S62 in FIG. 9.

Although in the restart control process of the present embodiment, the electromagnetic valve 7 is controlled to be closed when the valve-driving time period tc has elapsed after it was opened, this is not limitative, but the electromagnetic valve 7 may be controlled to be closed, as shown in FIG. 10A, when the engine rotational speed NE has exceeded a predetermined engine rotational speed NE2 (second predetermined engine rotational speed, fourth predetermined engine rotational speed (e.g. 600 rpm)) which is lower than the predetermined engine rotational speed NE1 employed as the reference value in the manual start control process. More specifically, steps S61, S62A, and S63 shown in FIG. 10A may be executed in place of the steps S60 to S63 in FIG. 9. That is, it is determined at the step S62A whether or not the engine rotational speed NE has exceeded the predetermined engine rotational speed NE2, and if NE>NE2 holds, the electromagnetic valve 7 is closed at the step S63.

As described above, at the restart of the engine 3, at which a decrease in the engine coolant temperature TW is small, and hence the engine 3 can be started easily, the predetermined engine rotational speed NE2 as a desired rotational speed for the engine 3 is set to be lower than the desired rotational speed NE1 employed for the manual start (NE2<NE1). As a result, excellent startability can be ensured for both the restart and the manual start of the engine 3. Further, since the time period for the supply of oil pressure is shortened, consumption of electric power by the motor 9 can be reduced.

Figure 10B:
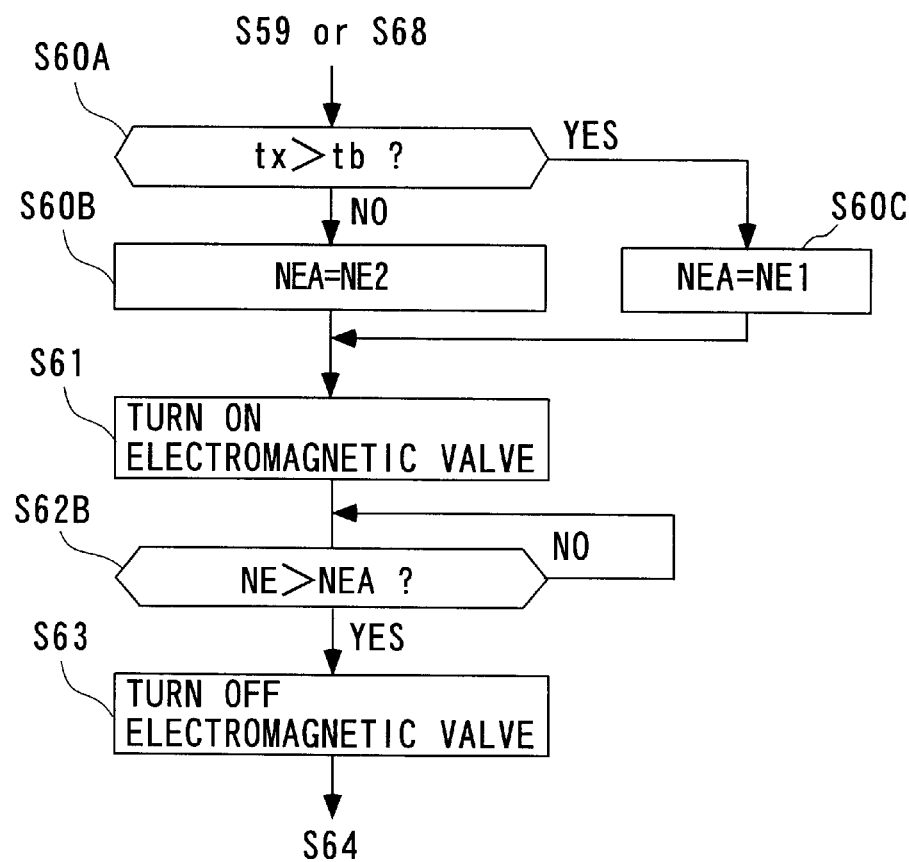

Further, as shown in FIG. 10B, the electromagnetic valve 7 may be controlled not with reference to the predetermined engine rotational speed NE1, but with reference to a predetermined engine rotational speed NEA which is set according to a stop time period tx before the start of the engine 3. More specifically, as shown in FIG. 10B, steps S60A, S60B, S60C, S61, S62B, and S63 may be executed. First, at the step S60A, it is determined whether or not the stop time period tx of the engine 3 has exceeded a predetermined time period tb. If tx≦tb holds, the predetermined engine rotational speed NEA is set to the predetermined engine rotational speed NE2 lower than the predetermined engine rotational speed NE1 at the step S62B, whereas if tx>tb holds, the predetermined engine rotational speed NEA is set to the predetermined engine rotational speed NE1 at the step S60C. Then, the electromagnetic valve 7 is turned on at the step S61, and when the engine rotational speed NE has exceeded the a predetermined engine rotational speed NEA (i.e. when the answer to the question of the step S62B becomes affirmative (Yes)), the electromagnetic valve 7 is turned off at the step S63. The ECU 2 is provided with a timer which is capable of operating even when the ignition key is in the OFF position, so as to determine the stop time period tx before the start of the engine 3 as the difference between a count of the timer at a time point the engine 3 is automatically stopped through the idling stop control process and a count of the same at a time point the engine 3 is restarted through the restart control process.

Through the above process, the cranking time period for cranking the engine 3 is set according to the stop time period tx before the start of the engine 3, so that excellent startability of the engine 3 can be maintained. This makes it possible to shorten the time period for the supply of oil pressure to the hydraulic motor 6 to thereby utilize the oil pressure accumulated in the accumulator 5 efficiently.

It should be noted that in the manual start control process shown in FIG. 5B as well, the predetermined engine rotational speed NE1 may be set in dependence on the stop time period tx before the start of the engine 3, as in the restart control process. In such a case, the stop time period tx is determined as the difference between a count of the timer at a time point the ignition key is turned to the OFF position and a count of the same at a time point the key is turned to the ON position from the OFF position.

Next, the manual stop control process according to the present embodiment will be described with reference to FIG. 11. This process is executed when the ignition key has been turned to the OFF position.

Figure 11:
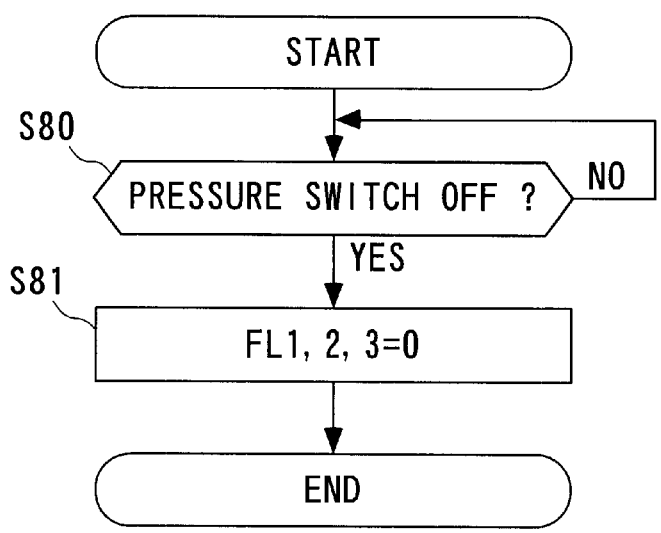
FIG. 11 is a flowchart showing a routine for carrying out a normal manual stop control process by using an ignition key.

As shown in FIG. 11, in the present process, first at a step S80, it is determined whether or not the pressure switch 15 is in the OFF state. If the pressure switch 15 is in the ON state, the step S80 is repeatedly carried out, whereas if the pressure switch 15 is in the OFF state, the program proceeds to a step S81. At the step S80, the three flags FL1, FL2, FL3 are set to "0", followed by terminating the program.

As described above, when the engine 3 is manually stopped, the manual stop control process is terminated after it has been checked that the pressure switch 15 is in the OFF state, i.e. that oil pressure which is equal to or higher than the predetermined pressure has been accumulated in the accumulator 5, so that it is possible to start the engine 3 immediately when the manual start control process is carried out next time.

Although in the above embodiment, the start control system 1 is applied to the internal combustion engine 3 for an automotive vehicle, this is not limitative, but the system 1 may be applied to any other type of vehicle equipped with an internal combustion engine, such as a two-wheeled vehicle with an internal combustion engine. Further, although the hydraulic motor 6 is employed as a hydraulic actuator for starting the engine 3, this is not limitative, but any hydraulic actuator, such as one of a rotary type or a reciprocating type, may be used so long as it is capable of starting an internal combustion engine.

Moreover, although the start control system 1 is applied to the engine 3 equipped with an electronically controlled 4-speed automatic transmission mechanism, it may be applied to an internal combustion engine equipped with a manual transmission mechanism. In this case, in the start control process, the step S2 in FIG. 3 should be omitted. Further, in the idling stop control process, the engine 3 should be controlled to be stopped under conditions that the shift position is the N (neutral) range, that the clutch pedal has been stepped on, and that the vehicle speed VP has been reduced to "0". Still further, in the restart control process, the engine 3 should be controlled to be restarted e.g. under at least one of conditions that the 1-speed gear or the 2-speed gear has been selected after stoppage of the engine 3, that the shift position is the neutral range and the clutch pedal has been stepped on, and that the brake pedal has been released.

It is further understood by those skilled in the art that the foregoing is a preferred embodiment of the invention, and that various changes and modifications may be made without departing from the spirit and scope thereof.

What is claimed is:

1. A start control system for an internal combustion engine, comprising:
    an electric motor;
    an oil pump driven by said electric motor;
    an accumulator for accumulating oil pressure delivered from said oil pump;
    an oil passage through which said oil pressure is transmitted;
    a hydraulic actuator connected to said accumulator via said oil passage and driven by said oil pressure accumulated in said accumulator, for starting said engine;
    an oil pressure supply control valve arranged across said oil passage, for controlling supply of said oil pressure to said hydraulic actuator;
    control means for controlling operation of said oil pressure supply control valve to thereby cause said hydraulic actuator to start said engine; and
    misfire-detecting means for detecting a misfire of said engine,
    wherein said control means controls said operation of said oil pressure supply control valve such that said supply of said oil pressure to said hydraulic actuator is stopped, depending on an output from said misfire-detecting means.

2. A start control system for an internal combustion engine, comprising:
    an electric motor;
    an oil pump driven by said electric motor;
    an accumulator for accumulating oil pressure delivered from said oil pump;
    an oil passage through which said oil pressure is transmitted;
    a hydraulic actuator connected to said accumulator via said oil passage and driven by said oil pressure accumulated in said accumulator, for starting said engine;
    an oil pressure supply control valve arranged across said oil passage, for controlling supply of said oil pressure to said hydraulic actuator;
    control means for controlling operation of said oil pressure supply control valve to thereby cause said hydraulic actuator to start said engine,
    a starter switch;
    manual operation-determining means for determining whether or not a driver has operated said starter switch after stoppage of said engine;
    wherein said control means controls said operation of said oil pressure supply control valve such that said supply of said oil pressure to said hydraulic actuator is stopped when a predetermined time period has elapsed after said supply of said oil pressure to said hydraulic actuator was started, and
    wherein when said manual operation-determining means determines that said starter switch has been operated, said predetermined time period is set to a first predetermined time period, while when said automatic restart-determining means determines that said engine should automatically be restarted, said predetermined time period is set to a second predetermined time period which is shorter than said first predetermined time period.

3. A start control system for an internal combustion engine, comprising:
    an electric motor;
    an oil pump driving by said electric motor;
    an accumulator for accumulating oil pressure delivered room said oil pump;
    an oil passage through which said oil pressure is transmitted;
    a hydraulic actuator connected to said accumulator via said oil passage and driven by said oil pressure accumulated in said accumulator, for starting said engine;
    an oil pressure supply control valve arranged across said oil passage, for controlling supply of said oil pressure to said hydraulic actuator;
    control means for controlling operation of said oil pressure supply control valve to thereby cause said hydraulic actuator to start said engine;
    engine rotational speed-detecting means for detecting an engine rotational speed of said engine; and
    engine temperature-detecting means for detecting an engine temperature of said engine,
    wherein said control means controls said operation of said oil pressure supply control valve such that said supply of said oil pressure to said hydraulic actuator is stopped when said detected engine rotational speed has exceeded a predetermined rotational speed after said supply of said oil pressure to said hydraulic actuator was started, and
    wherein said predetermined rotational speed is set to be higher as said detected engine temperature is lower.

4. A start control system according to claim 3, further comprising oil pressure-determining means for determining whether or not said oil pressure accumulated in said accumulator is sufficient for starting said engine, and accumulated pressure control means for controlling said electric motor such that said electric motor drives said oil pump until said oil pressure accumulated in said accumulator becomes sufficient for starting said engine, when said oil pressure-determining
means determines that said oil pressure accumulated in said accumulator is not sufficient for starting said engine.

5. A start control system for an internal combustion engine, comprising:
an electric motor;
an oil pump driven by said electric motor;
an accumulator for accumulating oil pressure delivered from said oil pump;
an oil passage through which said oil pressure is transmitted;
a hydraulic actuator connected to said accumulator via said oil passage and driven by said oil pressure accumulated in said accumulator, for starting said engine;
an oil pressure supply control valve arranged across said oil passage, for controlling supply of said oil pressure to said hydraulic actuator;
control means for controlling operation of said oil pressure supply control valve to thereby cause said hydraulic actuator to start said engine;
engine rotational speed-detecting means for detecting an engine rotational speed of said engine; and
a stop time period-determining means for determining whether or not a stop time period over which said engine has been in stoppage before a start of said engine is longer than a predetermined time period,
wherein said control means controls said operation of said oil pressure supply control valve such that said supply of said oil pressure supply control valve such that said supply of said oil pressure to said hydraulic actuator is stopped when said detected engine rotational speed has exceeded a predetermined rotational speed after said supply of said oil pressure to said hydraulic actuator was started, and
wherein when said stop time period-determining means determines that said stop time period is longer than said predetermined time period, said predetermined rotational speed is set to a first predetermined rotational speed, whereas when said stop time period-determining means determines that said stop time period is equal to or shorter than said predetermined time period, said predetermined rotational speed is set to a second predetermined rotational speed which is lower than said first predetermined rotational speed.

6. A start control system according to claim 5, further comprising oil pressure-determining means for determining whether or not said oil pressure accumulated in said accumulator is sufficient for starting said engine, and accumulated pressure control means for controlling said electric motor such that said electric motor drives said oil pump until said oil pressure accumulated in said accumulator becomes sufficient for starting said engine, when said oil pressure-determining means determines that said oil pressure accumulated in said accumulator is not sufficient for starting said engine.

7. A start control system for an internal combustion engine, comprising:

an electric motor;
an oil pump driven by said electric motor;
an accumulator for accumulating oil pressure delivered from said oil pump;
an oil passage through which said oil pressure is transmitted;
a hydraulic actuator connected to said accumulator via said oil passage and driven by said oil pressure accumulated in said accumulator, for starting said engine;
an oil pressure supply control valve arranged across said oil passage, for controlling supply of said oil pressure to said hydraulic actuator;
control means for controlling operation of said oil pressure supply control valve to thereby cause said hydraulic actuator to start said engine; and
engine temperature-detecting means for detecting an engine temperature of said engine,
wherein said control means controls said operation of said oil pressure supply control valve such that said supply of said oil pressure to said hydraulic actuator is stopped when a predetermined time period has elapsed after said supply of said oil pressure to said hydraulic actuator was started, and
wherein said predetermined time period is set to be longer as said detected engine temperature is lower.

8. A start control system according to claim 7, further comprising oil pressure-determining means for determining whether or not said oil pressure accumulated in said accumulator is sufficient for starting said engine, and accumulated pressure control means for controlling said electric motor such that said electric motor drives said oil pump until said oil pressure accumulated in said accumulator becomes sufficient for starting said engine, when said oil pressure-determining means determines that said oil pressure accumulated in said accumulator is not sufficient for starting said engine.

9. A start control system for an internal combustion engine, comprising:
an electric motor;
an oil pump driven by said electric motor;
an accumulator for accumulating oil pressure delivered from said oil pump;
an oil passage through which said oil pressure is transmitted;
a hydraulic actuator connected to said accumulator via said oil passage and driven by said oil pressure accumulated in said accumulator, for starting said engine;
an oil pressure supply control valve arranged across said oil passage, for controlling supply of said oil pressure to said hydraulic actuator;
control means for controlling operation of said oil pressure supply control valve to thereby cause said hydraulic actuator to start said engine;
a starter switch;
manual operation-determining means for determining whether or not a driver has operated said starter switch after stoppage of said engine;
automatic restart-determining means for determining whether or not said engine should automatically be restarted, based on operating conditions of a vehicle on which said engine is installed after said stoppage of said engine; and
engine rotational speed-detecting means for detecting an engine rotational speed of said engine, wherein said control means controls said operation of said oil pressure supply control valve such that said supply of said oil pressure to said hydraulic actuator is stopped when said detected engine rotational speed has exceeded a predetermined rotational speed after said supply of said oil pressure to said hydraulic actuator was started, and wherein when said manual operation-determining means determines that said starter switch has been operated, said predetermined rotational speed is set to a first predetermined rotational speed, while when said automatic restart-determining means determines that said engine should automatically be restarted, said predetermined rotational speed is set to a second predetermined rotational speed which is lower than said first predetermined rotational speed.

10. A start control system according to claim 9, further comprising a stop time period-determining means for determining whether or not a stop time period over which said engine has been in stoppage before a start of said engine is longer than a predetermined time period, and wherein said second predetermined rotational speed is set depending on determination of said stop time-determining means.

* * * * *